(12) United States Patent
Jeong et al.

(10) Patent No.: US 11,822,813 B2
(45) Date of Patent: Nov. 21, 2023

(54) STORAGE DEVICE, OPERATION METHOD OF STORAGE DEVICE, AND STORAGE SYSTEM USING THE SAME

(71) Applicant: SAMSUNG ELECTRONICS CO., LTD., Suwon-si (KR)

(72) Inventors: Wonseb Jeong, Suwon-si (KR); Yang Seok Ki, San Jose, CA (US); Jungmin Seo, Seongnam-si (KR); Beomkyu Shin, Seongnam-si (KR); Sangoak Woo, Anyang-si (KR); Younggeon Yoo, Seoul (KR); Chanho Yoon, Seoul (KR); Myungjune Jung, Suwon-si (KR)

(73) Assignee: Samsung Electronics Co., Ltd.

( * ) Notice: Subject to any disclaimer, the term of this patent is extended or adjusted under 35 U.S.C. 154(b) by 79 days.

(21) Appl. No.: 17/680,773

(22) Filed: Feb. 25, 2022

(65) Prior Publication Data

US 2023/0205449 A1    Jun. 29, 2023

Related U.S. Application Data

(60) Provisional application No. 63/294,251, filed on Dec. 28, 2021.

(30) Foreign Application Priority Data

Jan. 25, 2022    (KR) .......................... 10-2022-0010998

(51) Int. Cl.
*G06F 3/06* (2006.01)
*G06F 12/0802* (2016.01)

(52) U.S. Cl.
CPC .......... *G06F 3/0655* (2013.01); *G06F 3/0604* (2013.01); *G06F 3/0679* (2013.01); *G06F 12/0802* (2013.01); *G06F 2212/60* (2013.01)

(58) Field of Classification Search
None
See application file for complete search history.

(56) References Cited

U.S. PATENT DOCUMENTS

| 7,631,245 B2 | 12/2009 | Lasser |
| 8,291,151 B2 | 10/2012 | Sinclair |

(Continued)

FOREIGN PATENT DOCUMENTS

WO    WO2014093220 A1    6/2014

OTHER PUBLICATIONS

Examination Report From the European Patent Office dated Oct. 7, 2022.

*Primary Examiner* — Charles J Choi
(74) *Attorney, Agent, or Firm* — Fish & Richardson P.C.

(57) ABSTRACT

A storage device includes a nonvolatile memory device and a storage controller. The storage controller includes a multi-protocol host interface circuit that receives a first-type request including a first logical address from an external host and transmits/receives data corresponding to the first-type request with the external host by a block unit. Additionally, the multi-protocol host interface circuit receives a second-type request including a first physical address from the external host and transmits/receives data corresponding to the second-type request with the external host by a unit smaller than the block unit. A mapping cache manager manages an address translation table cache, sends an address translation request including the first physical address to the external host, and receives a response including mapping information corresponding to the first physical address from the external host.

20 Claims, 24 Drawing Sheets

(56) References Cited

U.S. PATENT DOCUMENTS

| | | | |
|---|---|---|---|
| 8,301,822 B2 | 10/2012 | Pinto et al. | |
| 8,427,891 B2 | 4/2013 | Best | |
| 8,924,629 B1 * | 12/2014 | Call | G06F 12/0246 |
| | | | 711/103 |
| 10,303,617 B2 | 5/2019 | Kim et al. | |
| 10,552,336 B2 | 2/2020 | Yoshida et al. | |
| 2020/0272583 A1 | 8/2020 | Li | |
| 2020/0409889 A1 | 12/2020 | Kale et al. | |
| 2021/0064293 A1 | 3/2021 | Cho | |

* cited by examiner

FIG. 14

| RQ Type | Minimum INFO | | | | Maximum INFO | | | |
|---|---|---|---|---|---|---|---|---|
| | Write BW | Read BW | Write latency | Read latency | Write BW | Read BW | Write latency | Read latency |
| T1RQ | WB_MIN1 | RB_MIN1 | WL_MIN1 | RL_MIN1 | WB_MAX1 | RB_MAX1 | WL_MAX1 | RL_MAX1 |
| T2RQ | WB_MIN2 | RB_MIN2 | WL_MIN2 | RL_MIN2 | WB_MAX2 | RB_MAX2 | WL_MAX2 | RL_MAX2 |

STORAGE DEVICE, OPERATION METHOD OF STORAGE DEVICE, AND STORAGE SYSTEM USING THE SAME

CROSS-REFERENCE TO RELATED APPLICATION(S)

This application claims the benefit under 35 USC 119(e) to Provisional Application No. 63/294,251 filed on Dec. 28, 2021, in the U.S. Patent and Trademark Office, the entire disclosure of which is incorporated herein by reference for all purposes.

BACKGROUND

Embodiments of the present disclosure described herein relate to a semiconductor memory and, more particularly, to a storage device, an operation method of the storage device, and a storage system using the same.

A semiconductor memory device is classified as a volatile memory device in which stored data disappear when a power supply is turned off, such as a static random access memory (SRAM) or a dynamic random access memory (DRAM), or a nonvolatile memory device in which stored data are retained even when a power supply is turned off, such as a flash memory device, a phase-change RAM (PRAM), a magnetic RAM (MRAM), a resistive RAM (RRAM), or a ferroelectric RAM (FRAM).

An operating system or an application uses a memory and a storage device. The memory may be used to store data temporarily, and the storage device may be used to store data without the loss of data for a long time. The operating system may manage the storage device based on a file system. The operating system may access the storage device in units of a logical block. A complicated stack of software operating for the purpose of the logical block-based access causes an increase in a latency and also causes an increase in an unnecessary data transfer, that is, an increase in power consumption.

SUMMARY

Embodiments of the present disclosure provide a storage device with improved performance and reduced costs, an operation method of the storage device, and a storage system using the same.

According to an embodiment, a storage device includes a nonvolatile memory device and a storage controller. The storage controller includes a multi-protocol host interface circuit that receives a first-type request including a first logical address from an external host, transmits/receives data corresponding to the first-type request to/from the external host by a block unit, receives a second-type request including a first physical address from the external host, and transmits/receives data corresponding to the second-type request to/from the external host by a unit smaller than the block unit. A mapping cache manager manages an address translation table cache, sends an address translation request including the first physical address to the external host, and receives a response including mapping information corresponding to the first physical address from the external host.

According to an embodiment, an operation method of a storage device which includes a nonvolatile memory device and a storage controller includes: (1) receiving a first-type request including a first logical address and first data size information of a first unit, which is a block unit, from an external host, (2) performing an operation corresponding to the first-type request on the nonvolatile memory device, (3) receiving a second-type request including a first physical address and second data size information of a second unit smaller than the first unit from an external host, (4) sending an address translation request including the first physical address to the external host in response to the second-type request, (5) receiving a response including a second logical address corresponding to the first physical address from the external host, and (6) performing an operation corresponding to the second-type request on the nonvolatile memory device based on the response including the second logical address.

According to an embodiment, a storage system includes a host that sends a first-type request including a first logical address, sends a second-type request including a first physical address, and manages mapping information between a logical address and a physical address. A storage device receives the first-type request and the second-type request from the host, caches a portion of the mapping information to manage an address mapping table cache, provides a data access of a block unit in response to the first-type request, and provides a data access of a unit smaller than the block unit in response to the second-type request.

BRIEF DESCRIPTION OF THE FIGURES

The above and other objects and features of the present disclosure will become apparent by describing in detail embodiments thereof with reference to the accompanying drawings.

FIG. 14 is a diagram illustrating an example of arbitration information.

DETAILED DESCRIPTION

Below, embodiments of the present disclosure will be described in detail and clearly to such an extent that one skilled in the art easily carries out the present disclosure.

Figure 1:
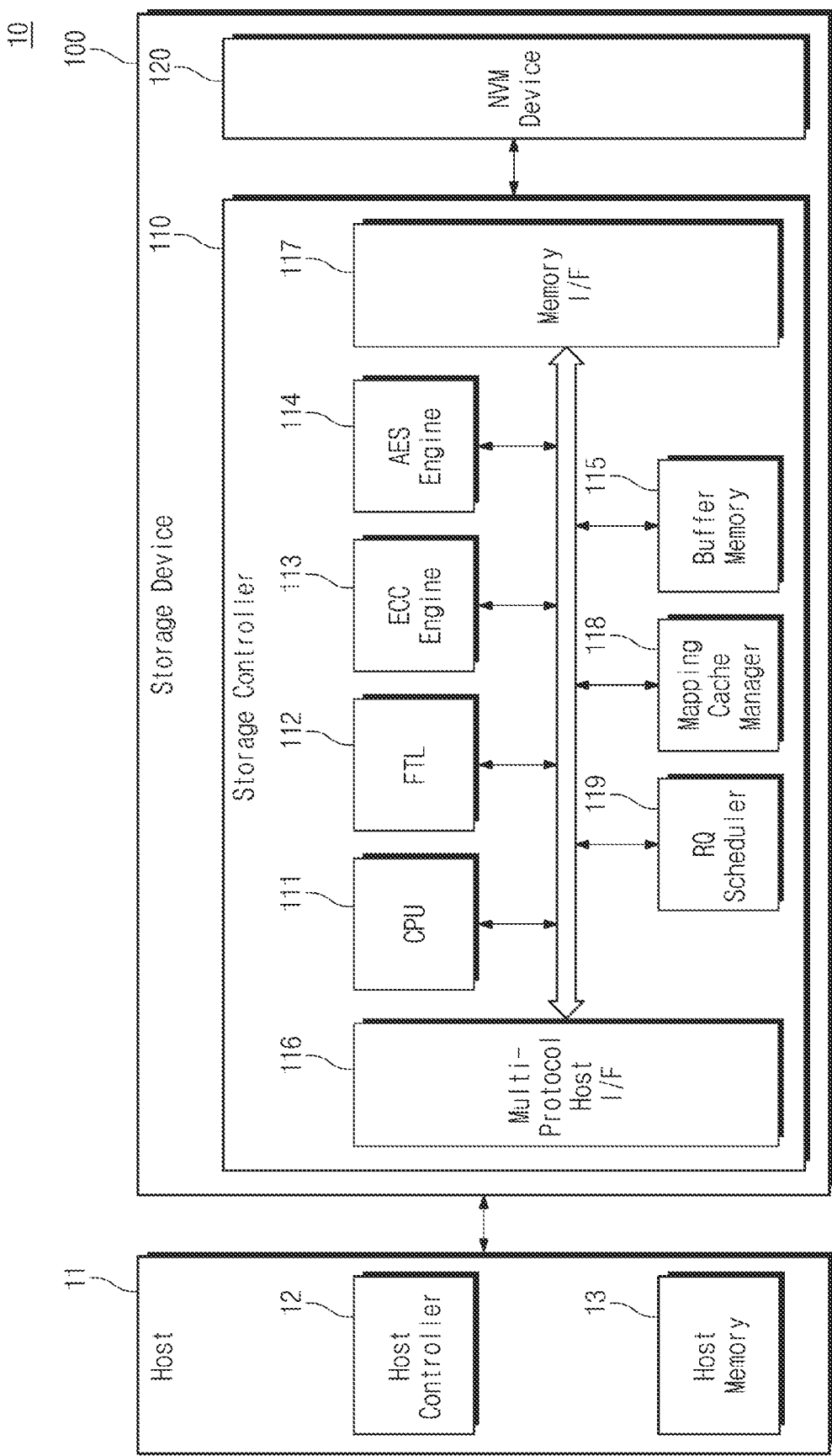
FIG. 1 is a block diagram illustrating a storage system according to an embodiment of the present disclosure.

FIG. 1 is a block diagram illustrating a storage system according to an embodiment of the present disclosure. Referring to FIG. 1, a storage system 10 may include a host 11 and a storage device 100. In an embodiment, the storage system 10 may be one of information processing devices, which are configured to process a variety of information and to store the processed information, such as a personal computer (PC), a laptop, a server, a workstation, a smartphone, a tablet PC, a digital camera, and a black box.

The host 11 may control an overall operation of the storage system 10. For example, the host 11 may send, to the storage device 100, a request (RQ) for storing data "DATA" in the storage device 100 or reading the data "DATA" stored in the storage device 100. In an embodiment, the host 11 may be a processor core that is configured to control the storage system 10, such as a central processing unit (CPU) or an application processor, or may be a computing node connected over a network.

In an embodiment, the host 11 may include a host controller 12 and a host memory 13. The host controller 12 may be a device configured to control an overall operation of the host 11 or to allow the host 11 to control the storage device 100. The host memory 13 may be a buffer memory, a cache memory, or a working memory that is used in the host 11.

In an embodiment, the host 11 may send a request T1RQ of a first type (hereinafter referred to as a "first-type request T1RQ") and a request T2RQ of a second type (hereinafter referred to as a "second-type request T2RQ") to the storage device 100. For example, a packet format corresponding to the first-type request T1RQ may correspond to an NVMe (Non-Volatile Memory express)™ protocol. The first-type request T1RQ may be used for a block-based access. That is, the first-type request T1RQ may be a block-based request including a logical block address LBA (or a logical address LA). The block-based request may indicate a position where data will be written and a position where data will be read, by using the logical block address LBA.

The first-type request T1RQ may include data size information of a block unit. The data size information may indicate a size of data to be transferred. For example, in a first-type read request, the data size information may indicate a size of read data to be transferred from the storage device 100 to the host; in a first-type write request, the data size information may indicate a size of write data to be transferred from the host 11 to the storage device 100. A unit of data corresponding to the first-type request T1RQ may correspond to a logical block size (e.g., 512 bytes) or a page size (e.g., 4 KB). However, the present disclosure is not limited thereto.

For example, a packet format corresponding to the second-type request T2RQ may correspond to a CXL (Compute eXpress Link)™ protocol (e.g., CXL.cache or CXL.mem). The second-type request T2RQ may be a memory-based request including a physical address PA. The memory-based request may indicate a position where data will be written and a position where data will be read, by using the physical address PA. The second-type request T2RQ may include data size information of a unit (e.g., a byte unit or a cache line unit) smaller than the block unit (or page unit). The data size information may indicate a size of data to be transferred. For example, in a second-type read request, the data size information may indicate a size of read data to be transferred from the storage device 100 to the host; in a second-type write request, the data size information may indicate a size of write data to be transferred from the host 11 to the storage device 100. A unit of data corresponding to the second-type request T2RQ may correspond to a byte or cache line size. However, the present disclosure is not limited thereto.

An example in which the storage system 10 includes one host is illustrated in FIG. 1, but the storage system 10 may include a plurality of hosts. Each of the plurality of hosts may be configured to access the storage device 100. For example, the plurality of hosts may be computing nodes configured to operate independently of each other. The plurality of hosts may be single-core or multi-core processors respectively included in different computing nodes (or computing systems). Alternatively, at least some of the plurality of hosts may be different processors included in the same computing node (or computing system). Alternatively, the plurality of hosts may be processors configured to process different applications.

In an embodiment, the storage system 10 may further include an accelerator (not illustrated). The accelerator may execute various kinds of arithmetic operations or calculations on data, instead of a host. The accelerator may be configured to access the storage device 100. For example, the accelerator may send the first-type request T1RQ and the second-type request T2RQ to the storage device 100.

The storage device 100 may operate under control of the host 11. The storage device 100 may include a storage controller 110 and a nonvolatile memory device 120. Under control of the host 11, the storage controller 110 may store data in the nonvolatile memory device 120 or may read data stored in the nonvolatile memory device 120. In an embodiment, the storage controller 110 may perform various management operations for efficiently using the nonvolatile memory device 120.

In an embodiment, the storage device 100 may include a mapping table MT and an address translation table cache ATTC. The mapping table MT may include mapping information between a physical page address PPA of the nonvolatile memory device 120 and a logical address LA from the host 11. The address translation table cache ATTC may include mapping information between a physical address PA from the host 11 and the logical address LA from the host 11. For example, the mapping table MT and the address translation table cache ATTC may be stored in a buffer memory 115 or the nonvolatile memory device 120.

The physical address PA may refer to an actual physical address of a hardware memory device that is managed by the host 11. The host 11 may recognize or manage a storage space of at least one memory device (e.g., a cache memory (not illustrated), the host memory 13, or the storage device 100) as the physical address PA. That is, the physical address PA may be used to access the storage space of the at least one memory device in units of byte or cache line.

The logical address LA may refer to the logical block address LBA that is managed by the host 11. A file system layer FS of the host 11 may recognize or manage a storage space of the storage device 100 as the logical address LA. That is, the logical address LA may be used to access the storage space of the storage device 100 in units of block or page.

The physical page address PPA may refer to an actual physical address of the nonvolatile memory device 120 that is managed by the storage controller 110. The storage controller 110 may recognize or manage the storage space of the nonvolatile memory device 120 as the physical page address PPA. That is, the physical page address PPA may be used to access the storage space of the nonvolatile memory device 120 in units of page.

In an embodiment, the host 11 may access the storage space of the storage device 100 by using the logical address LA or the physical address PA. For example, the storage space of the storage device 100 may be exposed to the host 11 as a memory mapped area. Alternatively, the storage space of the storage device 100 may be exposed to the host 11 as an area in which the block-based access is permitted.

Below, for convenience of description, an operation of translating the logical address LA into the physical page address PPA is referred to as a "first address translation operation", and an operation of translating the physical address PA into the logical address LA is referred to as a "second address translation operation".

The storage controller 110 may include a central processing unit (CPU) 111, a flash translation layer (FTL) 112, an error correction code (ECC) engine 113, an advanced encryption standard (AES) engine 114, the buffer memory 115, a multi-protocol host interface circuit 116, a memory interface circuit 117, a mapping cache manager 118, and a request scheduler 119.

The CPU 111 may control an overall operation of the storage controller 110. The FTL 112 may perform various operations for efficiently using the nonvolatile memory device 120. For example, the host 11 may manage the storage space of the storage device 100 as the logical address LA.

The FTL 112 may be configured to manage address mapping between the logical address LA from the host 11 and the physical page address PPA of the storage device 100. That is, the FTL 112 may manage the mapping table MT. The FTL 112 may perform the first address translation operation. For example, the FTL 112 may translate the logical address LA of the first-type request T1RQ into the physical page address PPA with reference to the mapping table MT. The FTL 112 may receive the logical address LA, which is translated based on the physical address PA of the second-type request T2RQ, and may translate the logical address LA into the physical page address PPA with reference to the mapping table MT.

The FTL 112 may perform a wear-leveling operation to prevent excessive degradation of a specific memory block of memory blocks of the nonvolatile memory device 120. A lifetime of the nonvolatile memory device 120 may be improved by the wear-leveling operation of the FTL 112. The FTL 112 may perform a garbage collection operation on the nonvolatile memory device 120 to secure a free memory block.

In an embodiment, the FTL 112 may be implemented in the form of hardware or software. In the case where the FTL 112 is implemented in the form of software, a program code or information associated with the FTL 112 may be stored in the buffer memory 115 and may be executed by the CPU 111. In the case where the FTL 112 is implemented in the form of hardware, a hardware accelerator configured to perform the operations of the FTL 112 may be provided separately from the CPU 111.

The ECC engine 113 may perform error detection and correction on data read from the nonvolatile memory device 120. For example, the ECC engine 113 may generate an error correction code (or a parity bit) for data to be written in the nonvolatile memory device 120. The generated error correction code (or parity bit) may be stored in the nonvolatile memory device 120 together with the data to be written. Afterwards, when the written data are read from the nonvolatile memory device 120, the ECC engine 113 may detect and correct an error of the read data based on the read data and the corresponding error correction code (or the corresponding parity bit).

The AES engine 114 may perform an encryption operation on data received from the host 11 or may perform a decryption operation on data received from the nonvolatile memory device 120. In an embodiment, the encryption operation and the decryption operation may be performed based on a symmetric-key algorithm.

The buffer memory 115 may be a write buffer or a read buffer configured to temporarily store data input to the storage controller 110. Alternatively, the buffer memory 115 may be configured to store a variety of information necessary for the storage controller 110 to operate. For example, the buffer memory 115 may store a mapping table that is managed by the FTL 112. Alternatively, the buffer memory 115 may store software, firmware, or information that is associated with the FTL 112.

In an embodiment, the buffer memory 115 may be an SRAM, but the present disclosure is not limited thereto. For example, the buffer memory 115 may be implemented with various kinds of memory devices such as a DRAM, an MRAM, and a PRAM. For brevity of drawing and for convenience of description, an example in which the buffer memory 115 is included in the storage controller 110 is illustrated in FIG. 1, but the present disclosure is not limited thereto. The buffer memory 115 may be placed outside the storage controller 110, and the storage controller 110 may communicate with the buffer memory 115 through a separate communication channel or interface.

In an embodiment, the buffer memory 115 may include the mapping table MT and the address translation table cache ATTC. Alternatively, the buffer memory 115 may store information (e.g., a parameter) associated with an arbitration operation.

The multi-protocol host interface circuit 116 may be configured to communicate with the host 11 in compliance with a given interface protocol. In an embodiment, the given interface protocol may include at least one of protocols for various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, a USB (Universal Serial Bus) interface, an SD (Secure Digital) card interface, an MMC (Multi-Media Card) interface, an eMMC (embedded Multi-Media Card) interface, a UFS (Universal Flash Storage) interface, an eUFS (embedded Universal Flash Storage) interface, a CF (Compact Flash) card interface, or a network interface. The multi-protocol host interface circuit 116 may receive a signal, which is based on the given interface protocol, from the host 11 and may operate based on the received signal. Alternatively, the multi-protocol host interface circuit 116 may send a signal, which is based on the given interface protocol, to the host 11.

In an embodiment, the multi-protocol host interface circuit 116 may communicate with the host 11 through at least two interfaces. For example, the multi-protocol host interface circuit 116 may communicate with the host 11 through a block interface sending and receiving the first-type request T1RQ and may communicate with the host 11 through a memory interface sending and receiving the second-type request T2RQ. A configuration and an operation method of the multi-protocol host interface circuit 116 will be described in detail with reference to FIG. 3.

The memory interface circuit 117 may communicate with the nonvolatile memory device 120 in compliance with a given communication protocol. In an embodiment, the given interface protocol may include at least one of protocols for various interfaces such as a toggle interface and an open NAND flash interface (ONFI). In an embodiment, the memory interface circuit 117 may communicate with the nonvolatile memory device 120 based on the toggle interface. In this case, the memory interface circuit 117 may communicate with the nonvolatile memory device 120 through a plurality of channels CHs. In an embodiment, each of the plurality of channels CHs may include a plurality of signal lines configured to transfer various control signals (e.g., /CE, CLE, ALE, /WE, /RE, and R/B), data signals DQ, and a data strobe signal DQS.

In an embodiment, the mapping cache manager 118 may cache address mapping information that is managed in the host 11. For example, the mapping cache manager 118 may cache a frequently accessed portion of the address mapping information managed in the host 11 and may manage the cached portion as the address translation table cache ATTC. In other words, the mapping cache manager 118 may manage address mapping between the physical address PA and the logical address LA.

In an embodiment, the mapping cache manager 118 may manage the address translation table cache ATTC. For example, the address translation table cache ATTC may include a plurality of entries each including a tag and data. For example, the tag may be used to store information of the physical address PA and the data may be used to store information of the logical address LA.

The mapping cache manager 118 may check whether translation associated with the given physical address PA is cached in the address translation table cache ATTC. When the translation (i.e., mapping information) associated with the given physical address PA is cached in the address translation table cache ATTC (when a cache hit occur), the translation may be immediately available. When valid translation associated with the given physical address PA is absent from the address translation table cache ATTC (when a cache miss occurs), translation associated with the given physical address PA may be updated in the address translation table cache ATTC through a translation request.

In an embodiment, the mapping cache manager 118 may support cache coherence. For example, the storage system 10 may provide the cache coherence by using a CXL (Compute eXpress Link)™ protocol (e.g., CXL.cache). The storage system 10 may provide the cache coherence through a snoop request and a response. The storage system 10 may provide the cache coherence through a cache coherence directory.

The mapping cache manager 118 may perform the second address translation operation. For example, the mapping cache manager 118 may receive the second-type request T2RQ, may determine the physical address PA in the second-type request T2RQ, and may translate the physical address PA into the logical address LA with reference to the address translation table cache ATTC.

In an embodiment, the mapping cache manager 118 may determine a ratio of a cache hit and a cache miss with regard to the second-type requests T2RQ. The mapping cache manager 118 may send information about the ratio of a cache miss and a cache hit to the request scheduler 119.

The request scheduler 119 may be configured to schedule requests from the host 11. For example, the request scheduler 119 may be configured to schedule first-type requests and second-type requests. The request scheduler 119 may be configured to detect and manage performance by monitoring requests to be processed.

In an embodiment, the request scheduler 119 may receive arbitration information from the host 11. The request scheduler 119 may order requests based on the arbitration information. The request scheduler 119 may schedule requests in consideration of states of current input/output requests, a QoS configuration, and pieces of information about a ratio of a cache miss and a cache hit received from the mapping cache manager 118.

Under control of the storage controller 110, the nonvolatile memory device 120 may be configured to store data, to output the stored data, or to erase the stored data. In an embodiment, the nonvolatile memory device 120 may be a two-dimensional or three-dimensional NAND flash memory device, but the present disclosure is not limited thereto. For example, the nonvolatile memory device 120 may be an MRAM (Magnetic RAM), an SST-MRAM (Spin-Transfer Torque MRAM), a CBRAM (Conductive bridging RAM), an FeRAM (Ferroelectric RAM), a PRAM (Phase RAM), an RRAM (Resistive RAM), or a memory device that is based on various kinds of memories different from each other. In an embodiment, the nonvolatile memory device 120 may include a plurality of nonvolatile memories, each of which is implemented with an independent chip or an independent package. The storage controller 110 may communicate with the plurality of nonvolatile memories of the nonvolatile memory device 120 through a plurality of channels.

As described above, the storage device 100 according to an embodiment of the present disclosure may cache address mapping information managed by the host 11 and may provide cache coherence. Also, the storage device 100 may support both the block interface and the memory interface.

Figure 2:
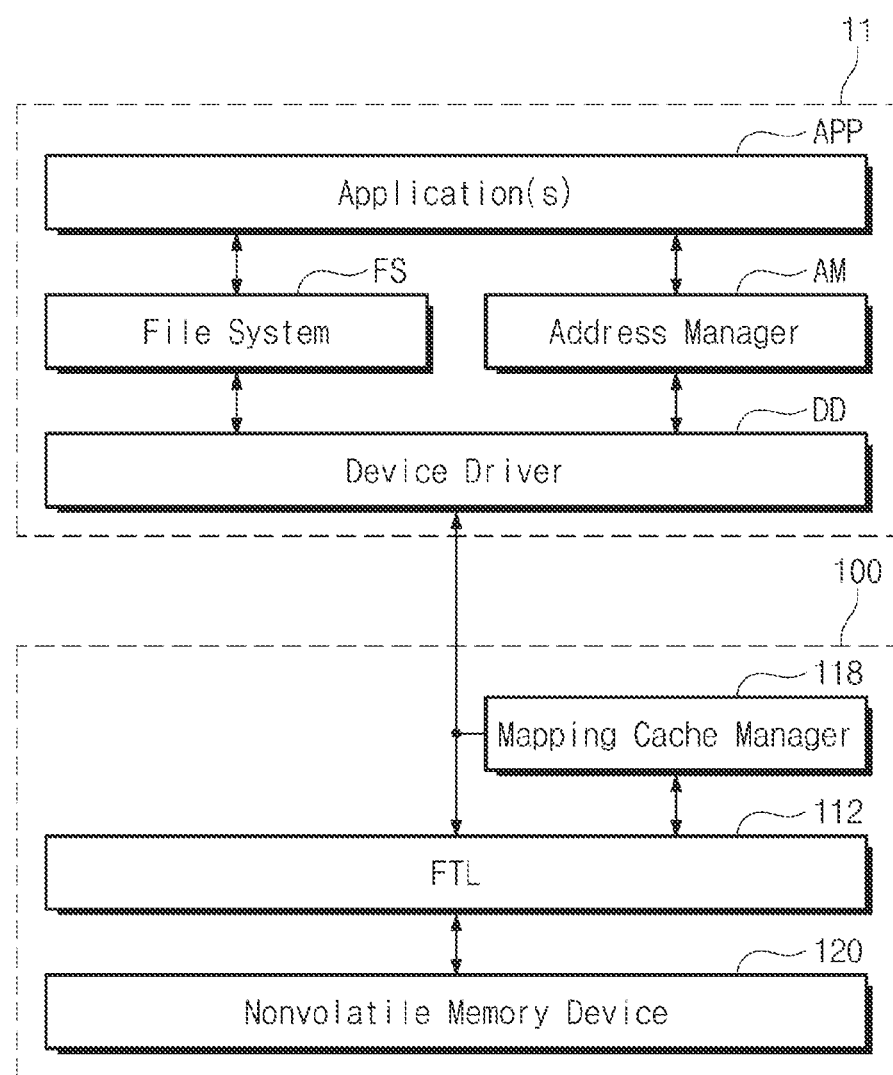
FIG. 2 is a diagram illustrating software layers of a storage system of FIG. 1.

FIG. 2 is a diagram illustrating software layers of a storage system of FIG. 1. Referring to FIGS. 1 and 2, the storage system 10 may include a plurality of software layers, that is, an application layer APP, the file system layer FS, an address manager AM, a device driver layer DD, the mapping cache manager 118, and the FTL 112.

The application layer APP may include various application programs that are driven by the host 11. The file system layer FS may be configured to organize files or data that are used by the application layer APP. For example, the file system layer FS may manage the storage space of the storage device 100 as the logical address LA. The file system layer FS may allocate a logical block address to data to be stored in the storage device 100 and may manage the logical block address. In an embodiment, the file system layer FS may have a type that is variable depending on an operating system OS of the host 11. The file system layer FS may include at least one of various file systems such as a FAT (File Allocation Table), a FAT32, an NTFS (NT File System), an HFS (Hierarchical File System), a JSF2 (Journaled File System2), an XFS, an ODS-5 (On-Disk Structure-5), a UDF, a ZFS, a UFS (Unix File System), an ext2, an ext3, an ext4, a ReiserFS, a Reiser4, an ISO 9660, a Gnome VFS, a BFS, and a WinFS.

The address manager AM may manage the storage space of the storage device 100 as the physical address PA. The address manager AM may translate the physical address PA into the logical address LA or may translate the logical address LA into the physical address PA. That is, the address manager AM may map a physical address space onto a logical address space or may map a logical address space onto a physical address space. The address manager AM may manage mapping information associated with the logical address LA and the physical address PA.

In an embodiment, in response to a translation request of the storage device 100, the address manager AM may translate the physical address PA into the logical address LA and may send a response including the logical address LA to the storage device 100. When the mapping information is updated, the address manager AM may send an invalidation request or an update request to the storage device 100.

The device driver layer DD may perform an operation of translating information from the address manager AM, the file system layer FS, or the application layer APP into information recognizable by the storage device 100. In an embodiment, the application layer APP, the file system layer FS, the address manager AM, and the device driver layer DD may be implemented in the form of software and may be driven on the host 11.

The mapping cache manager 118 may cache a portion of address mapping information that the address manager AM manages. The mapping cache manager 118 may cache mapping information about a frequently accessed address. When the cache miss occurs, the mapping cache manager 118 may receive mapping information from the address manager AM through the translation request and may update the address translation table cache ATTC. The mapping cache manager 118 may translate the physical address PA into the logical address LA with reference to the address translation table cache ATTC.

The FTL 112 may be configured to translate the logical address LA of the request received from the host 11 into the physical page address PPA to be used in the nonvolatile memory device 120.

In a conventional storage system, a storage device provides only an input/output request of a block or page unit. The input/output request of the block or page unit is provided to the storage device through the file system layer FS. As the size of data that the application layer APP requires becomes smaller than the block or page unit, the overhead of software layers may increase. In this case, the unnecessary data transfer increases. As such, the performance of the application layer APP decreases, and the whole power/energy efficiency of the storage system decreases.

The storage device 100 according to an embodiment of the present disclosure may process both a first-type input/output request and a second-type input/output request. That is, the storage device 100 may provide an input/output request of the block or page unit and may provide an input/output request of a unit (e.g., a byte unit) smaller than the block or page unit. In other words, the storage device 100 may provide both the block interface and the memory interface.

In the case where data whose size is smaller than the block or page unit are required, the application layer APP may access the storage device 100 through the second-type input/output request. That is, the storage system 10 according to an embodiment of the present disclosure may bypass a part (e.g., the file system layer FS) of a software stack necessary to process an input/output request of the block unit through the second-type input/output request and interrupt processing may be removed. As such, a latency associated with an access to data stored in the storage device may decrease. Because only data whose size is smaller than the block or page unit are accessed, the unnecessary data transfer may decrease. Accordingly, the power/energy efficiency may be improved. That is, an interface between a host and a storage device is simplified and, thus, a storage system with improved performance and reduced costs is provided.

Figure 3:
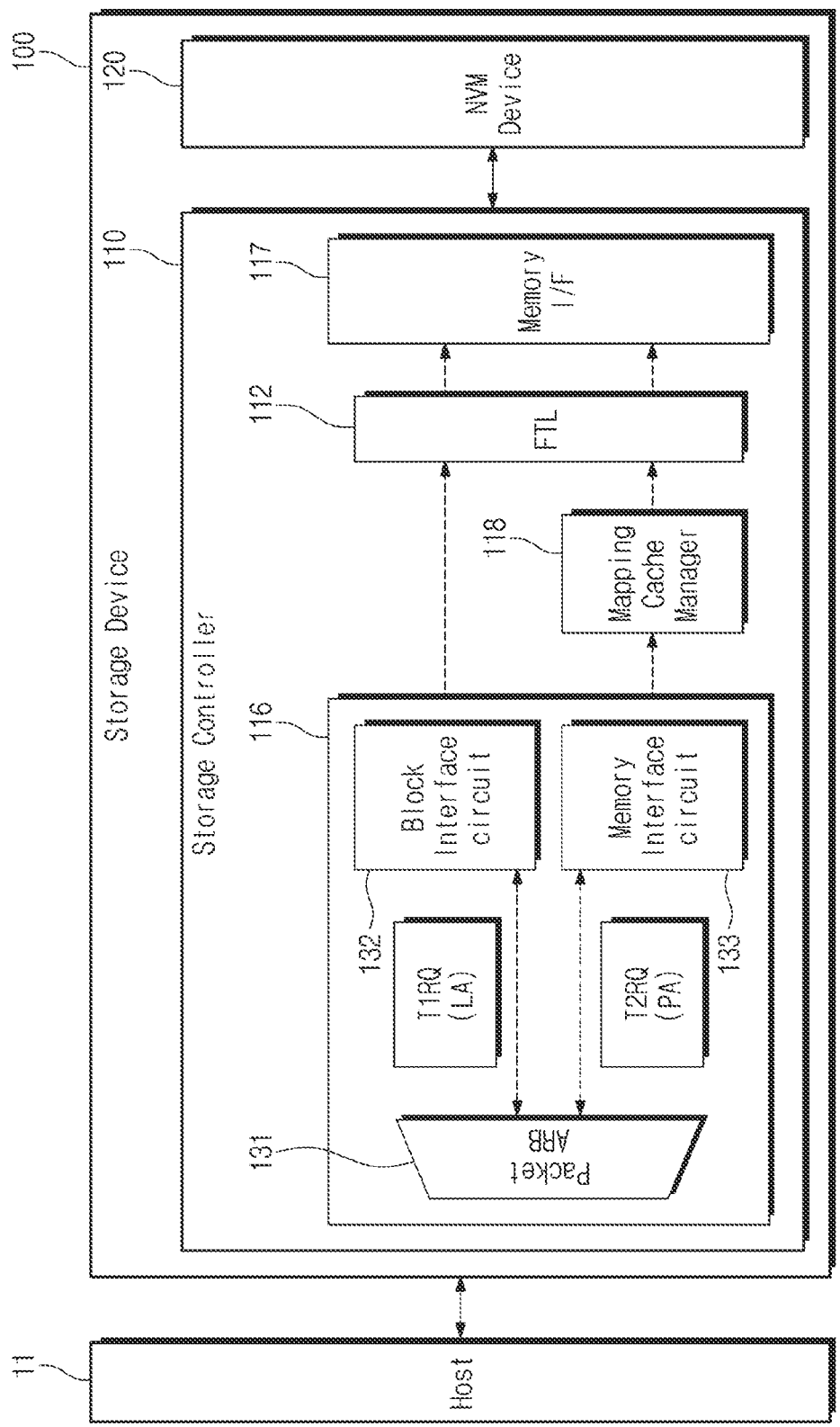
FIG. 3 is a diagram for describing an example of an operation method of a storage device of FIG. 1.

FIG. 3 is a diagram for describing an example of an operation method of a storage device of FIG. 1. Referring to FIGS. 1 and 3, the host 11 may send the first-type request T1RQ and the second-type request T2RQ to the storage device 100. The first-type request T1RQ may include the logical address LA, and the second-type request T2RQ may include the physical address PA.

In an embodiment, the multi-protocol host interface circuit 116 of the storage device 100 may include a packet arbitrator 131, a block-based interface circuit 132, and a memory interface circuit 133. The packet arbitrator 131 may receive the first-type request T1RQ and the second-type request T2RQ from an external device. The packet arbitrator 131 may transfer the first-type request T1RQ to the block-based interface circuit 132. The packet arbitrator 131 may transfer the second-type request T2RQ to the memory interface circuit 133.

In an embodiment, the block-based interface circuit 132 may transfer the first-type request T1RQ to the FTL 112. The FTL 112 may control operations accompanied by the first-type request T1RQ and may translate the logical address LA into the physical page address PPA with reference to the mapping table MT. The FTL 112 may send a command corresponding to the first-type request T1RQ to the nonvolatile memory device 120.

In an embodiment, the memory-based interface circuit 133 may transfer the second-type request T2RQ to the mapping cache manager 118. The mapping cache manager 118 may translate the physical address PA into the logical address LA with reference to the address translation table cache ATTC. The mapping cache manager 118 may transfer the second-type request T2RQ and the logical address LA to the FTL 112. The FTL 112 may control operations accompanied by the second-type request T2RQ and may translate the logical address LA into the physical page address PPA with reference to the mapping table MT. The FTL 112 may send a command corresponding to the second-type request T2RQ to the nonvolatile memory device 120.

As described above, the storage device 100 may provide a multi-protocol interface (or a heterogeneous protocol interface) and the host 11 may access the storage space of the storage device 100 through multiple protocols at the same time. That is, the host 11 may access the storage space of the storage device 100 at the same time through both the first-type request and the second-type request.

Figure 4:
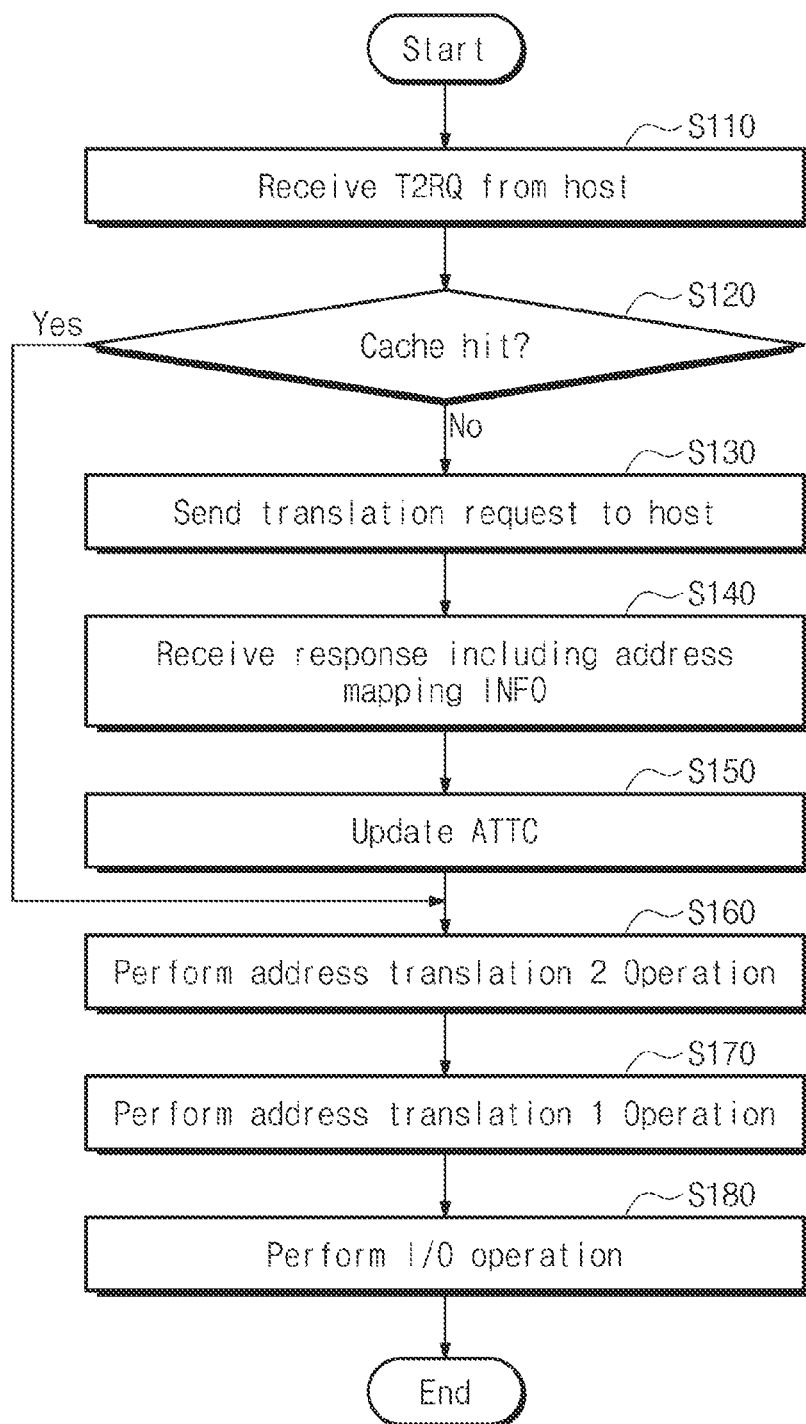
FIG. 4 is a flowchart illustrating an example of an operation of a storage device of FIG. 1.

FIG. 4 is a flowchart illustrating an example of an operation of a storage device of FIG. 1. Referring to FIGS. 1 and 4, in operation S110 the storage device 100 may receive the second-type request T2RQ (or the second-type input/output request) from the external host 11. For example, the input/output request may include a read request or a write request. The second-type request T2RQ may include the physical address PA, data size information, and the like. The storage controller 110 may detect the physical address PA from the second-type request T2RQ. That is, the storage controller 110 may determine the physical address PA corresponding to the second-type request T2RQ.

In operation S120, the storage device 100 may determine whether a cache hit occurs. For example, the storage controller 110 may determine whether mapping information corresponding to the physical address PA is present in the address translation table cache ATTC. The cache hit may indicate the case where the mapping information corresponding to the physical address PA included in the second-type request T2RQ is present in the address translation table cache ATTC. A cache miss may indicate the case where the mapping information corresponding to the physical address PA included in the second-type request T2RQ is absent from the address translation table cache ATTC. In the case of the cache hit, the storage device 100 performs operation S160; in the case of the cache miss, the storage device 100 performs operation S130.

In operation S130, the storage device 100 may send a translation request to the host 11. For example, the storage device 100 may send an address translation request for requesting mapping information between the physical address PA and the logical address LA to the host 11. The translation request may include an address that is not translated or may include an address requiring translation. That is, the translation request may include the physical address PA.

For example, the storage controller 110 may request the mapping information by using the address translation services (ATS) of the PCIe. The storage controller 110 may request mapping information through translation requests of the ATS. Alternatively, the storage controller 110 may request mapping information by using the CXL (Compute eXpress Link)™ protocol (e.g., CXL.cache). However, the present disclosure is not limited thereto.

In operation S140, the storage device 100 may receive a response including the address mapping information from the host 11. For example, the storage controller 110 may receive a translation completion from the host 11. The translation completion may include translation status information and a translated address. The translation completion may include the logical address LA corresponding to the physical address PA included in the translation request. The translation status information may indicate "success", "fail", "error", "unsupported request", or the like.

In operation S150, the storage device 100 may update the address translation table cache ATTC. For example, the storage controller 110 may update the address translation table cache ATTC based on the translation completion provided from the host 11. The storage controller 110 may store the corresponding logical address LA in the address translation table cache ATTC so as to be correlated with the physical address PA.

In operation S160, the storage device 100 may perform the second address translation operation. For example, the storage controller 110 may perform the second address translation operation with reference to the address translation table cache ATTC. The storage controller 110 may translate the physical address PA included in the second-type request T2RQ into the logical address LA based on the address translation table cache ATTC.

In operation S170, the storage device 100 may perform the first address translation operation. For example, the storage controller 110 may perform the first address translation operation with reference to the mapping table MT. The storage controller 110 may translate the logical address LA into the physical page address PPA based on the mapping table MT.

In operation S180, the storage device 100 may perform an input/output operation. For example, the storage controller 110 may provide data stored at the physical page address PPA of the nonvolatile memory device 120 to the host 11 or may store data at the physical page address PPA of the nonvolatile memory device 120. That is, the storage controller 110 may send the physical page address PPA and the command corresponding to the second-type request T2RQ to the nonvolatile memory device 120.

Figure 5:
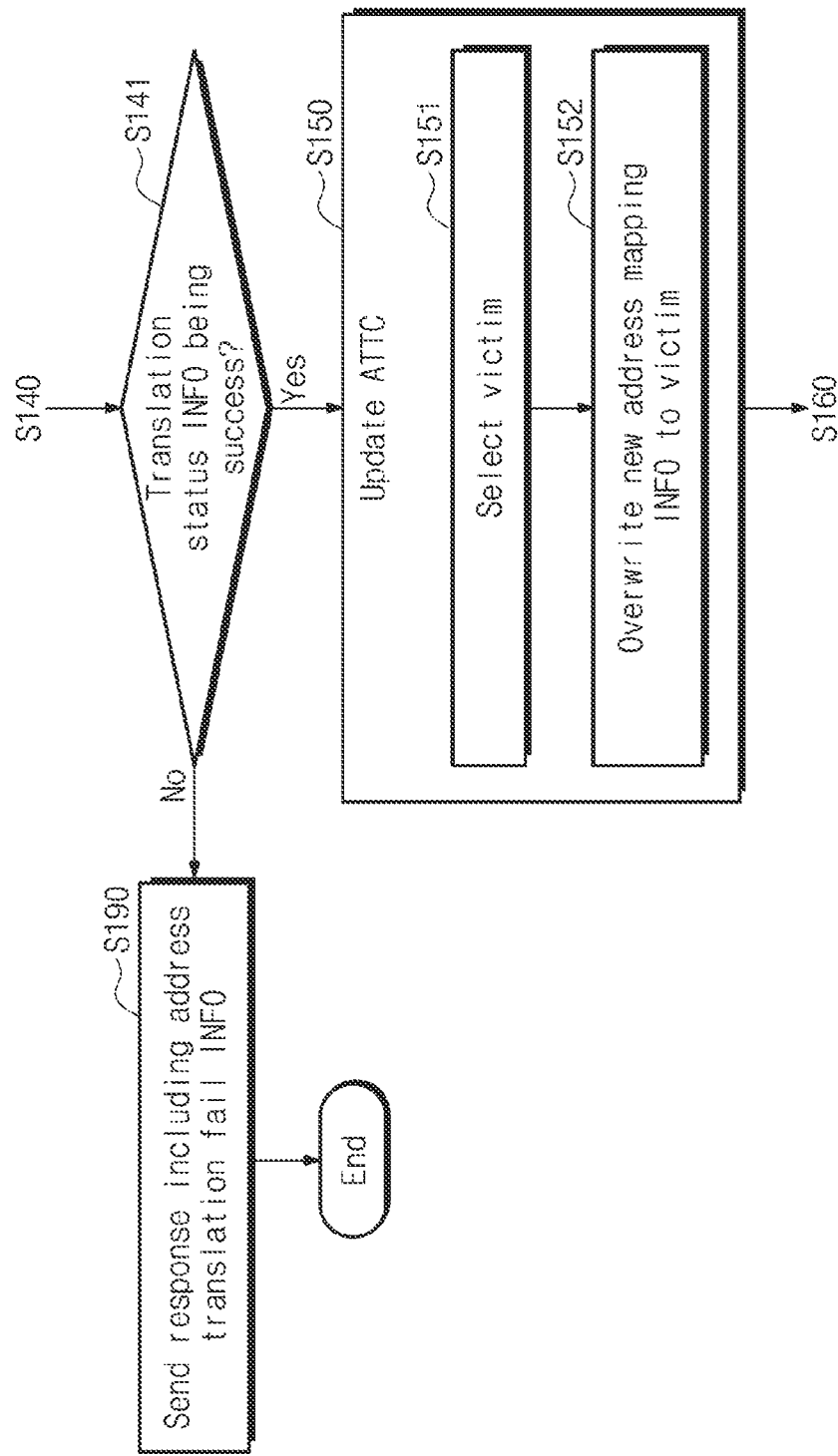
FIG. 5 is a flowchart illustrating operation S140 and operation S150 of FIG. 4 in detail.

FIG. 5 is a flowchart illustrating operation S140 and operation S150 of FIG. 4 in detail. Referring to FIGS. 1, 4, and 5, in operation S141 the storage device 100 may determine whether the translation status information is "success". When it is determined that the translation status information is "success", the storage device 100 may perform operation S150; when it is determined that the translation status information is not "success", the storage device 100 may perform operation S190.

In operation S150, the storage device 100 may update the address translation table cache ATTC based on the translation completion. Operation S150 may include operation S151 and operation S152. In operation S151, the storage device 100 may select a victim entry. For example, the storage controller 110 may select one victim entry from a plurality of entries of the address translation table cache ATTC. The storage controller 110 may select the victim entry by using a way to select a least recently used entry, a way to select a most recently used entry, or a first in first out (FIFO) way. For example, each of the entries of the address translation table cache ATTC may include the physical address PA, the logical address LA, a valid bit, a dirty bit, and a tag.

In operation S152, the storage device 100 may store or overwrite new address mapping information in or on the victim entry. For example, the storage controller 110 may store the logical address LA associated with the physical address PA in the victim entry of the address translation table cache ATTC.

In operation S190, the storage device 100 may determine the received request to be an address translation fail based on the translation status information and may send a response including information about the address translation fail to the host 11. For example, because the translation status information does not indicate "success", the storage controller 110 fails to know the logical address LA corresponding to the physical address PA. In the case where the physical address PA included in the second-type request T2RQ is incapable of being accessed by the storage device 100, the translation status information may indicate "fail". The storage controller 110 may indicate the received request to be an address translation fail based on the translation status information and may send a response that corresponds to the second-type request T2RQ and includes information about the address translation fail to the host 11.

FIGS. 6A to 6E are diagrams for describing operations of a storage system of FIG. 1. Below, for convenience of description, components that are unnecessary to describe an operation of the storage system 10 are omitted. In FIGS. 6A to 6E, the mapping table MT and the address translation table cache ATTC are illustrated as being stored in the buffer memory 115. However, this is an example for describing an embodiment of the present disclosure clearly and the present disclosure is not limited thereto. The mapping table MT and the address translation table cache ATTC may be stored in an SRAM, a DRAM, or the nonvolatile memory device 120.

Figure 6A:
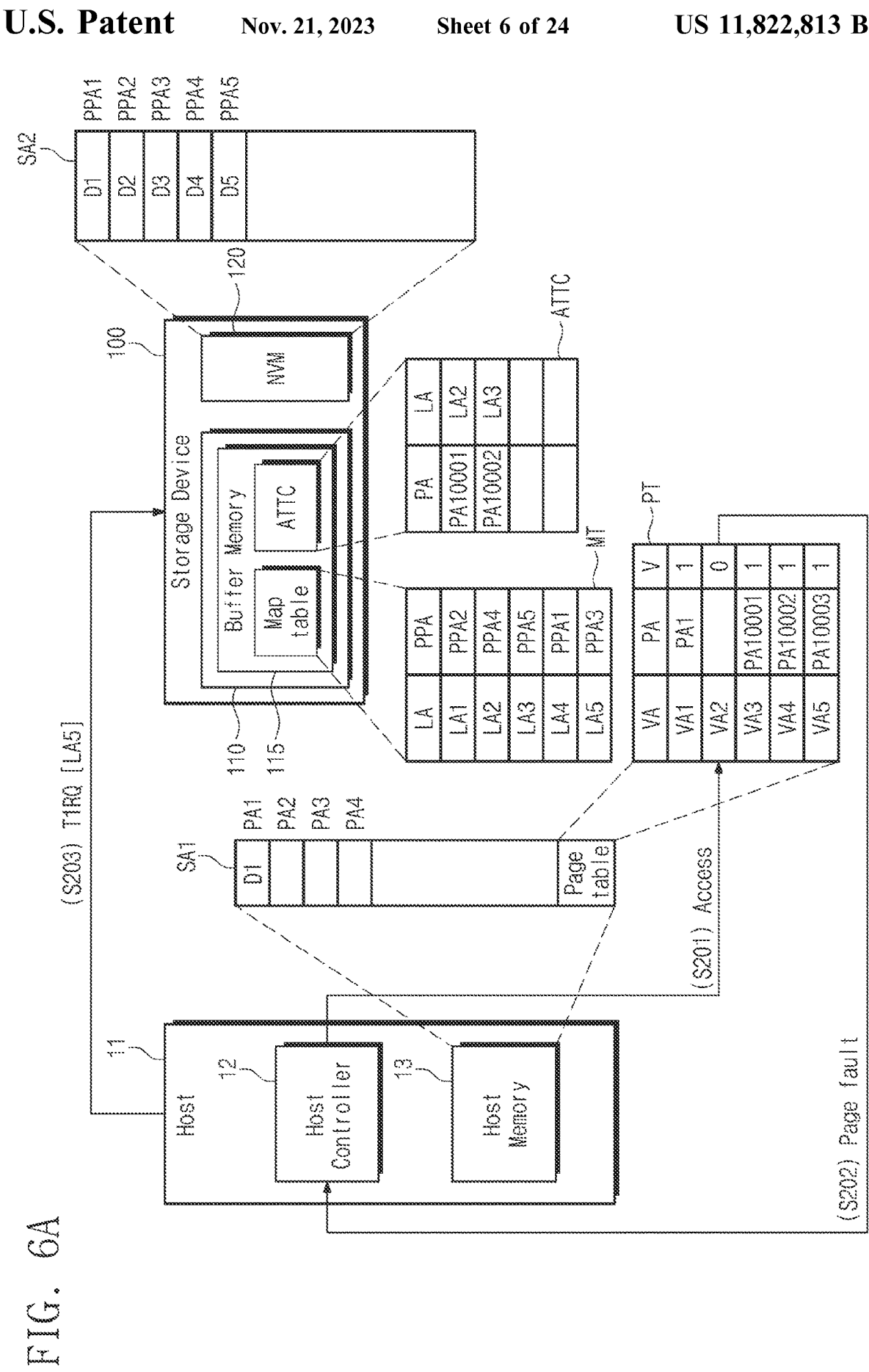
FIGS. 6A to 6E are diagrams for describing operations of a storage system of FIG. 1.

Referring to FIGS. 1 and 6A, the operating system OS may be executed by the host controller 12. Also, based on the support of the operating system OS, the application layer APP (hereinafter referred to as an "application") may be executed by the host controller 12. The operating system OS may include a page fault handling (PFH) unit. The PFH unit may process a page fault occurring when the application APP accesses the host memory 13. The plurality of applications APP may respectively include private virtual memory spaces such that multiple tasks may be executed. The operating system OS may map a virtual address space of a process according to the execution of an application onto a physical address space. The operating system OS may manage mapping to efficiently use a limited capacity of a memory installed in hardware.

In an embodiment, the host controller 12 may identify the storage space of the host memory 13. The storage space of the host memory 13 is illustrated by a first storage area SAL The host controller 12 may access the first storage area SA1 of the host memory 13 based on the physical address PA.

The host controller 12 (e.g., a memory management unit (MMU)) may translate a virtual address VA into an actual address or the physical address PA of the host memory 13. The host controller 12 may translate the virtual address VA, which is used as the application APP is executed, into the physical address PA. The host controller 12 may translate the virtual address VA into the physical address PA with reference to a page table PT.

The host controller 12 may manage address translation information (e.g., a translation table or the page table PT) between the virtual address VA and the physical address PA. For example, the page table PT may be a data structure storing mapping between the virtual address VA and the physical address PA. The host controller 12 may store the mapping information between the virtual address VA and the physical address PA in the first storage area SA1 of the host memory 13 as the page table PT. Each of a plurality of entries of the page table PT may include the virtual address VA, the physical address PA, and a valid bit "V". The valid bit "V" may refer to a bit indicating whether the corresponding entry is valid. The case where the valid bit "V" has a first logical value (e.g., "0") indicating a disable state indicates that the corresponding entry is not valid; the case where the valid bit "V" has a second logical value (e.g., "1") indicating an enable state indicates that the corresponding entry is valid.

The storage device 100 may expose a user area capacity of the capacity of the nonvolatile memory device 120 other than an over-provision area capacity to the host 11. For example, the capacity of the over-provision area may be used for the storage controller 110 to perform various background operations such as a read reclaim operation, a wear leveling operation, and a garbage collection operation. Also, the capacity of the over-provision area may be used to write update data of data written in the user area. That is, the capacity of the over-provision area may be used to prevent an increase in a latency and a decrease in a lifetime due to an erase-before-write characteristic of the storage device 100.

The host 11 may identify the capacity of the user area of the storage device 100 as a portion of an area to which the logical address LA is allocated. The host 11 may allocate the logical address LA to the capacity of the user area of the storage device 100 and may access the capacity of the user area by using the logical address LA. That is, the host 11 may access the user area of the storage device 100 based on the logical address LA. Alternatively, the host 11 may allocate the physical address PA to the capacity of the user area of the storage device 100 and may access the capacity of the user area by using the physical address PA. That is, the host 11 may access the capacity of the user area of the storage device 100 based on the physical address PA.

For example, the storage controller 110 may identify the storage space of the nonvolatile memory device 120. The storage space of the nonvolatile memory device 120 is illustrated by a second storage area SA2. For example, the second storage area SA2 may include the user area and the over-provision area of the storage device 100. The storage controller 110 may access the nonvolatile memory device 120 based on the physical page address PPA. That is, the storage controller 110 may access the second storage area SA2 of the nonvolatile memory device 120 based on the physical page address PPA.

The storage controller 110 may manage the mapping table MT and the address translation table cache ATTC. The mapping table MT is a data structure storing mapping between the logical address LA and the physical page address PPA. The address translation table cache ATTC is a data structure storing mapping between the physical address PA and the logical address LA. The FTL 112 may translate the logical address LA into the physical page address PPA with reference to the mapping table MT. The mapping cache manager 118 may translate the physical address PA into the physical page address PPA with reference to the address translation table cache ATTC.

In the following drawing, for brevity of drawing and for convenience of description, first data D1 may be stored in the first storage area SAE The first data D1 may correspond to a first physical address PAL First to fifth data D1 to D5 may be stored in the second storage area SA2. A first physical page address PPA1 may correspond to the first data D1, a second physical page address PPA2 may correspond to the second data D2, a third physical page address PPA3 may correspond to the third data D3, a fourth physical page address PPA4 may correspond to the fourth data D4, and a fifth physical page address PPA5 may correspond to the fifth data D5.

The mapping table MT may include mapping information associated with first to fifth logical addresses LA1 to LA5. The first logical address LA1 may correspond to the second physical page address PPA2, the second logical address LA2 may correspond to the fourth physical page address PPA4, the third logical address LA3 may correspond to the fifth physical page address PPA5, the fourth logical address LA4 may correspond to the first physical page address PPA1, and the fifth logical address LA5 may correspond to the third physical page address PPA3.

The address translation table cache ATTC may include mapping information associated with a plurality of physical addresses PA10001 and PA10002. The first physical address PA10001 may correspond to the second logical address LA2, and the second physical address PA10002 may correspond to the third logical address LA3.

The page table PT may include mapping information associated with first to fifth virtual addresses VA1 to VA5. The first virtual address VA1 may correspond to the first physical address PA1, and the valid bit "V" corresponding to the first virtual address VA1 may have the second logical value (e.g., "1"). The valid bit "V" corresponding to the second virtual address VA2 may have the first logical value (e.g., "0"). The third virtual address VA3 may correspond to the physical address PA10001, and the valid bit "V" corresponding to the third virtual address VA3 may have the second logical value (e.g., "1"). The fourth virtual address VA4 may correspond to the physical address PA10002, and the valid bit "V" corresponding to the fourth virtual address VA4 may have the second logical value (e.g., "1"). The fifth virtual address VA5 may correspond to the physical address PA10003, and the valid bit "V" corresponding to the fifth virtual address VA5 may have the second logical value (e.g., "1"). However, this is an example for describing an embodiment of the present disclosure clearly and the present disclosure is not limited thereto.

In operation S201, for the third data D3, the host controller 12 may direct the access to the second virtual address VA2. The host controller 12 may search the page table PT. When valid mapping information of the virtual address VA is absent from the page table PT, a page fault may occur. Because the valid bit "V" of the second virtual address VA2 has the first logical value (e.g., "0"), the page fault may occur in operation S202. That is, because a valid physical address corresponding to the second virtual address VA2 does not exist, the page fault may occur.

For example, when an application requests allocation of a new memory, the operating system OS may direct a memory access for the allocation of the memory. Because the allocation of the new memory that is not used previously is requested, mapping information may be absent from the page table PT. That is, when the allocation of the new memory is performed, the page fault may occur.

When the page fault occurs, context switching from the application to the operating system OS may be performed. The page fault handling (PFH) unit of the operating system OS may perform fault handling. For example, the page fault handling (PFH) unit may map the second physical address PA2 of the host memory 13 onto the second virtual address VA2 requested by the application. For example, when a free capacity of the host memory 13 is insufficient, the host controller 12 may secure the free capacity of the first storage area SA1 by swapping a portion of data stored in the first storage area SA1 of the host memory 13 to the storage device 100 and releasing the storage space of the swapped data.

In operation S203, the host controller 12 may send a read request including the fifth logical address LA5 to the storage device 100. For example, the host controller 12 may send the first-type request T1RQ (e.g., a first-type read request) including the fifth logical address LA5 to the storage device 100. The fifth logical address LA5 may be a logical address corresponding to the third data D3.

In response to the first-type request T1RQ, the storage device 100 may translate the fifth logical address LA5 into the third physical page address PPA3 with reference to the mapping table MT. The storage device 100 may read the third data D3 from the nonvolatile memory device 120 based on the third physical page address PPA3.

Figure 6B:
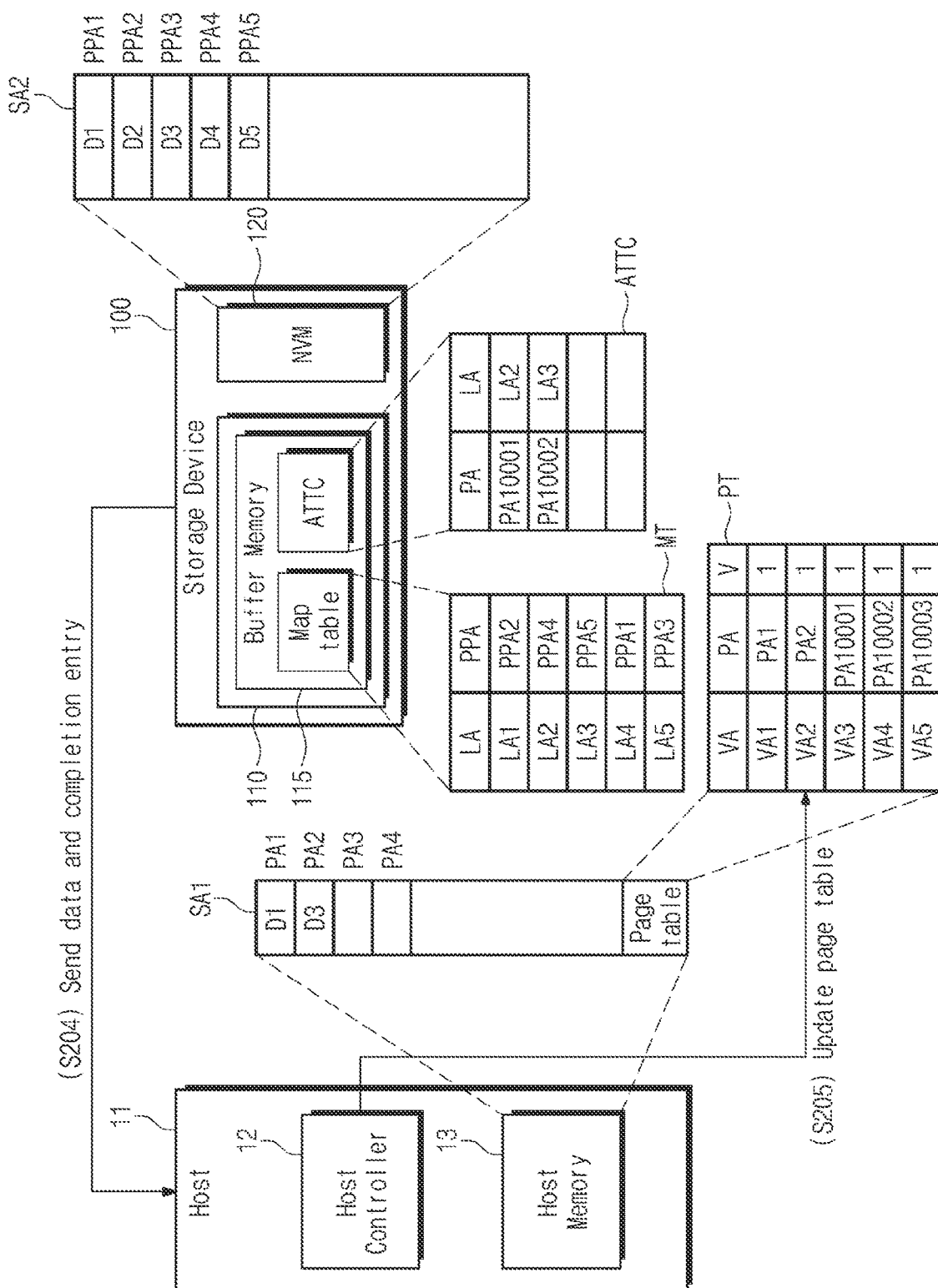

Referring to FIG. 6B, in operation S204 the storage device 100 may write the third data D3 at the second physical address PA2 of the host memory 13. Because the third data D3 are data corresponding to the first-type request T1RQ, the storage device 100 may send the data to the host 11 in units of block or page. The storage device 100 may send a completion entry associated with the first-type request T1RQ to the host 11.

In operation S205, the host controller 12 may update the page table PT. For example, the host controller 12 may update the page table PT by writing mapping information between the second virtual address VA2 and the second physical address PA2 in the page table PT. After the fault processing is completed, the context switching from the page fault handling (PFH) unit to the application may be performed.

Figure 6C:
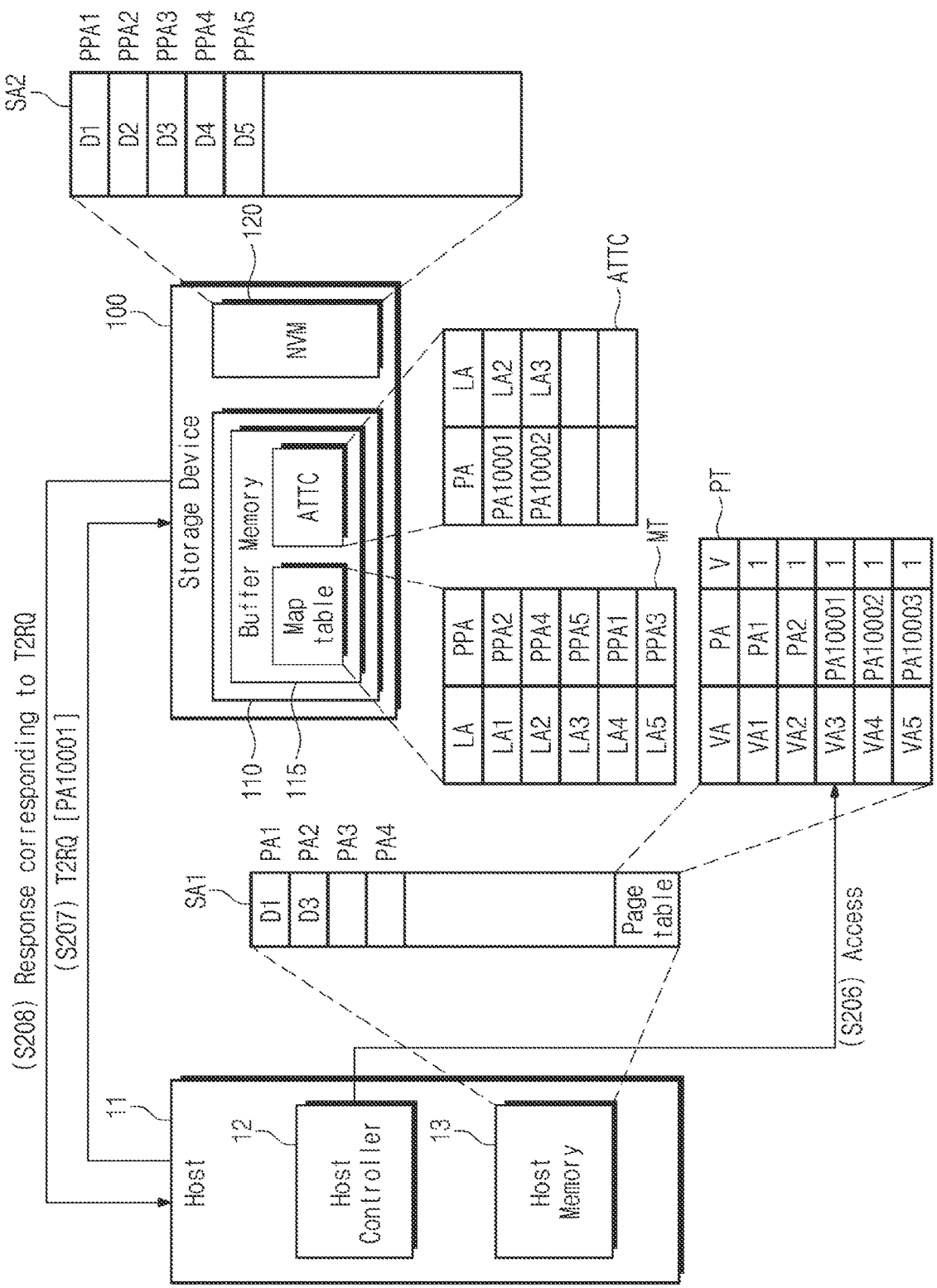

Referring to FIG. 6C, in operation S206, for a portion of the fourth data D4, the host controller 12 may direct the access to the third virtual address VA3. For example, the host controller 12 may require data whose unit (e.g., byte or cache line unit) is smaller than the block unit or the page unit.

The host controller 12 may perform an address translation operation with reference to the page table PT. For example, because the valid bit "V" of the third virtual address VA3 indicates the second logical value (e.g., "1"), the host controller 12 may translate a physical address corresponding to the third virtual address VA3. That is, the host controller 12 may translate the third virtual address VA3 into the physical address PA10001.

In operation S207, the host controller 12 may send the second-type request T2RQ including the physical address PA10001 to the storage device 100. For example, the host controller 12 may send the second-type read request including the physical address PA10001 to the storage device 100. The second-type read request may include a data size indicating a size smaller than the block unit or the page unit. Because the physical address PA10001 does not indicate the first storage area SA1 of the host memory 13 and indicates the user area of the storage device 100, the host controller 12 may send the read request to the storage device 100.

The storage controller 110 may perform the second address translation operation in response to the second-type request T2RQ. The storage controller 110 may determine the physical address PA10001 from the second-type request T2RQ. The storage controller 110 may determine whether mapping information about the physical address PA10001 exists, with reference to the address translation table cache ATTC. Because the mapping information about the physical address PA10001 is present in the address translation table cache ATTC (because the cache hit occurs), the storage controller 110 may translate the physical address PA10001 into the logical address LA2. The storage controller 110 may translate the logical address LA2 into the fourth physical page address PPA4 with reference to the mapping table MT. The storage controller 110 may read the fourth data D4 from the nonvolatile memory device 120 based on the fourth physical page address PPA4.

In operation S208, the storage controller 110 may send a portion of the fourth data D4 corresponding to the second-type read request and a response to the host 11. For example, the storage device 100 may send, to the host 11, a portion of the fourth data D4 corresponding to the data size (e.g., smaller than the block unit or the page unit) included in the second-type read request.

Figure 6D:
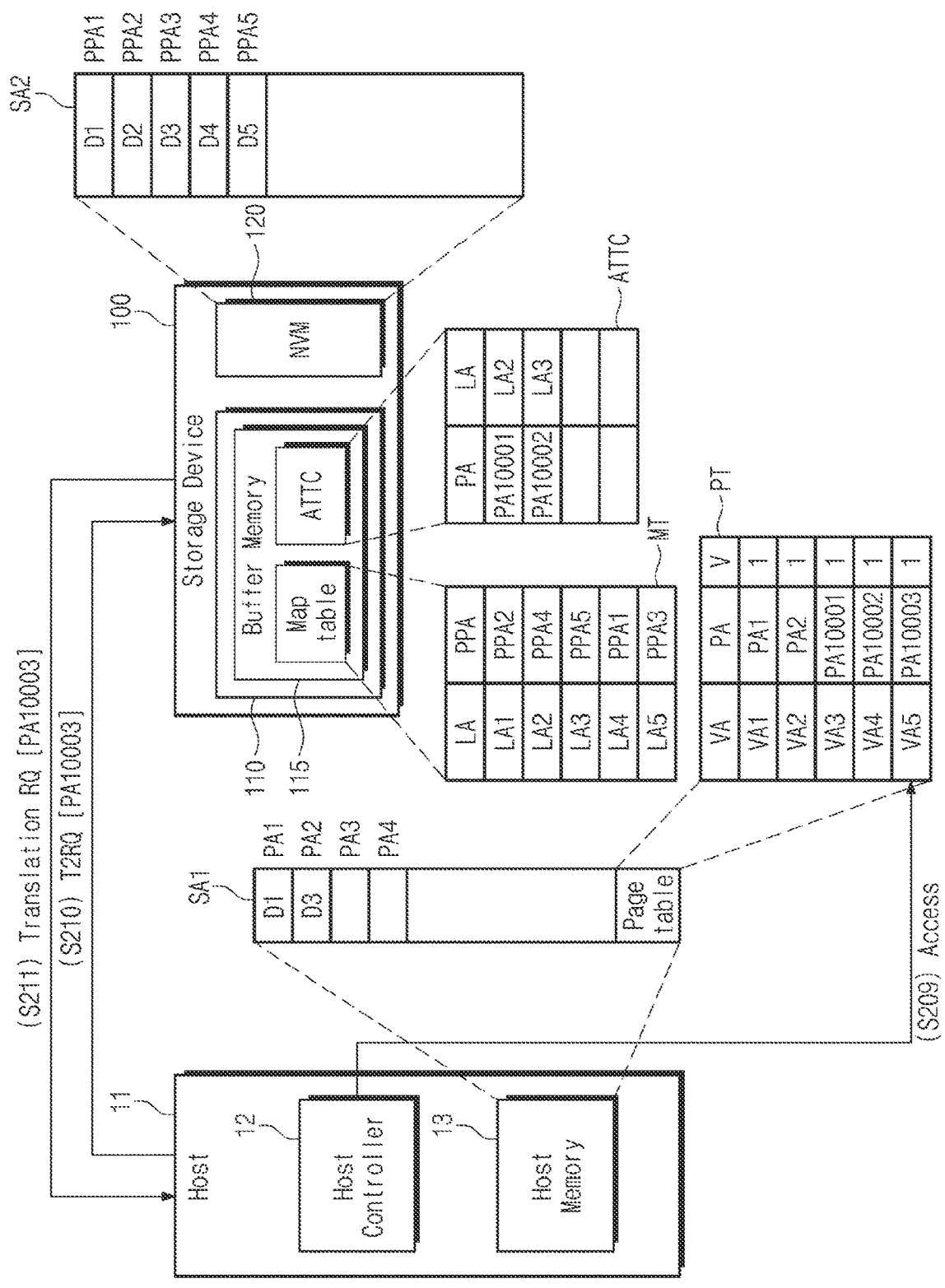

Referring to FIG. 6D, in operation S209, for a portion of the second data D2, the host controller 12 may direct the access to the fifth virtual address VA5. The host controller 12 may translate the fifth virtual address VA5 into the physical address PA10003 with reference to the page table PT. In operation S210, the host controller 12 may send the second-type request T2RQ (e.g., the second-type read request) including the physical address PA10003 to the storage device 100. The second-type read request may include a data size indicating a size smaller than the block unit or the page unit.

The storage controller 110 may determine the physical address PA10003 from the second-type request T2RQ. The storage controller 110 may determine whether mapping information about the physical address PA10003 exists, with reference to the address translation table cache ATTC. Because the mapping information about the physical address PA10003 is absent from the address translation table cache ATTC (because the cache miss occurs), in operation S211 the storage controller 110 may send the translation request including the physical address PA10003 to the host 11 in response to the second-type request T2RQ.

Figure 6E:
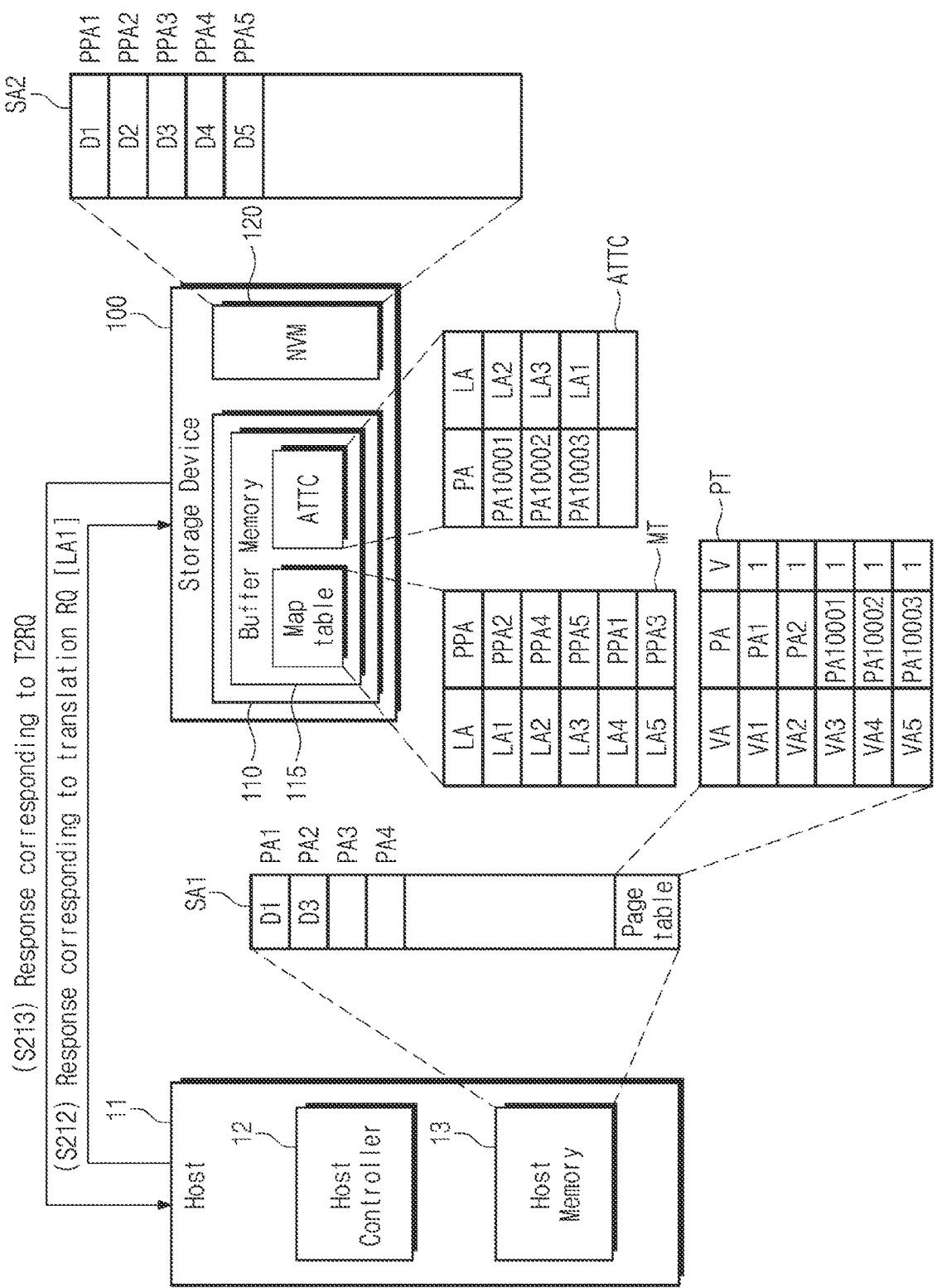

The host controller 12 may perform an address translation operation with reference to the translation request. That is, the host controller 12 may translate the physical address PA10003 into the second logical address LA1. Referring to FIG. 6E, in operation S212, the host controller 12 may send a response corresponding to the translation request to the storage device 100. For example, the host controller 12 may send the translation completion including the first logical address LA1 to the storage device 100.

The storage device 100 may receive the translation completion including the first logical address LA1. The storage device 100 may update the address translation table cache ATTC in response to the translation completion. For example, the storage controller 110 may store the first logical address LA1 in the address translation table cache ATTC so as to be correlated with the physical address PA10003.

The storage controller 110 may perform the second address translation operation based on the address translation table cache ATTC. That is, the storage controller 110 may translate the physical address PA10003 into the first logical address LA1. The storage controller 110 may perform the first address translation operation based on the mapping table MT. That is, the storage controller 110 may translate the first logical address LA1 into the second physical page address PPA2. The storage controller 110 may read the second data D2 from the nonvolatile memory device 120 based on the second physical page address PPA2.

In operation S213, the storage device 100 may send a portion of the second data D2 corresponding to the second-type read request and a response to the host 11. For example, the storage device 100 may send, to the host 11, a portion of the second data D2 corresponding to the data size (e.g., smaller than the block unit or the page unit) included in the second-type request T2RQ.

As described above, the storage device 100 may provide data of the block unit or page unit based on the logical address LA and may provide data whose unit (e.g., byte or cache line unit) is smaller than the block unit or the page unit based on the physical address PA. The above embodiments are described based on the read request, but the present disclosure is not limited thereto. For example, an operation of the storage system 10 associated with the write request may be the same as or similar to that described above.

Figure 7A:
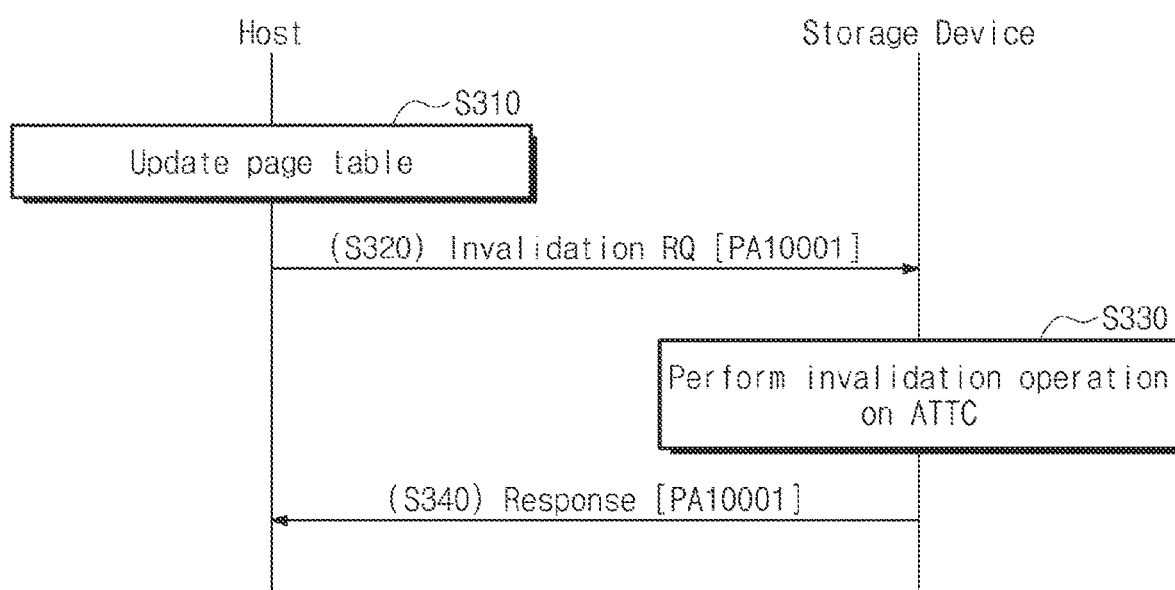
FIGS. 7A to 7C are diagrams illustrating operation examples of a storage system of FIG. 1.
Figure 7B:
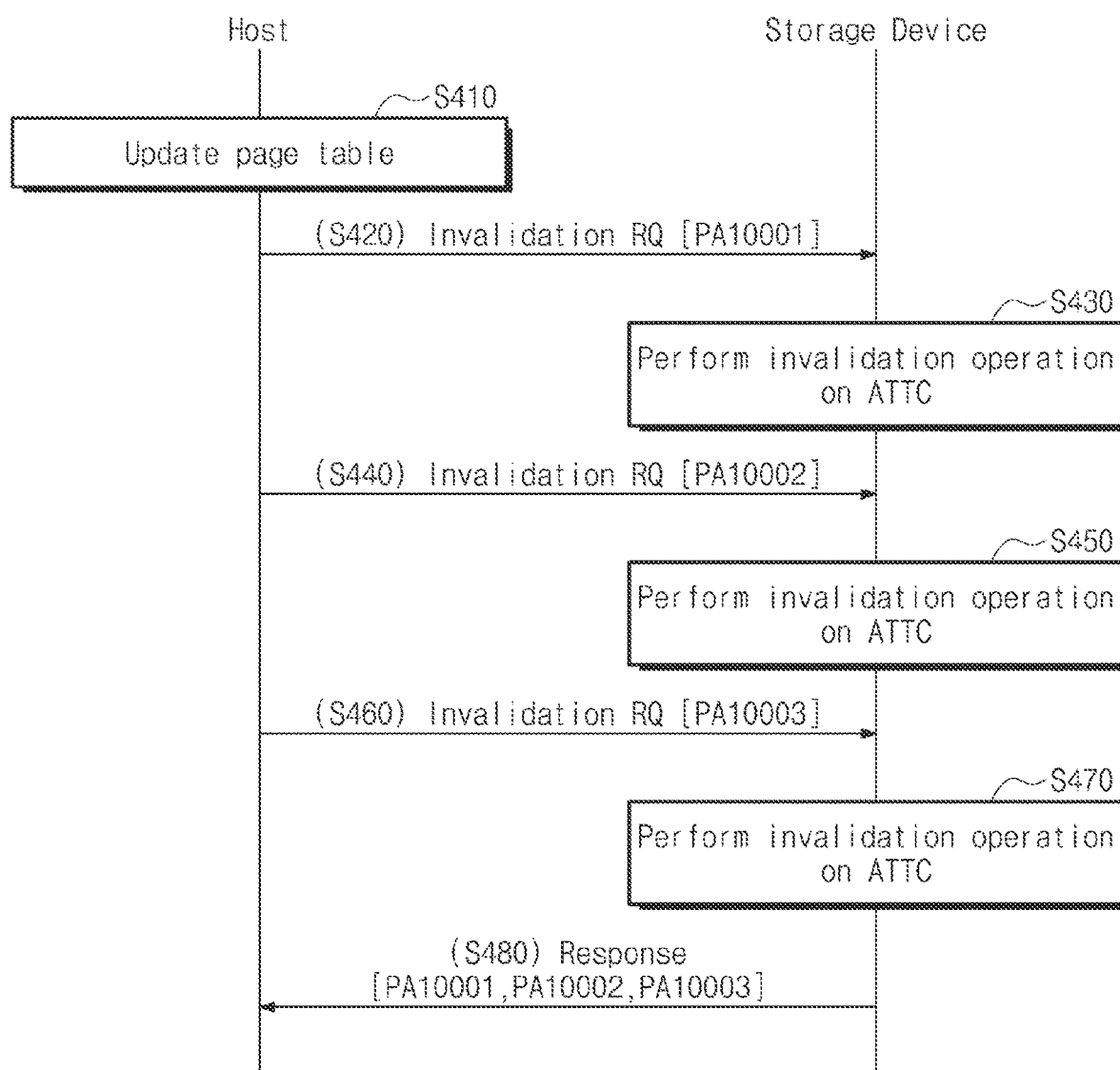
Figure 7C:
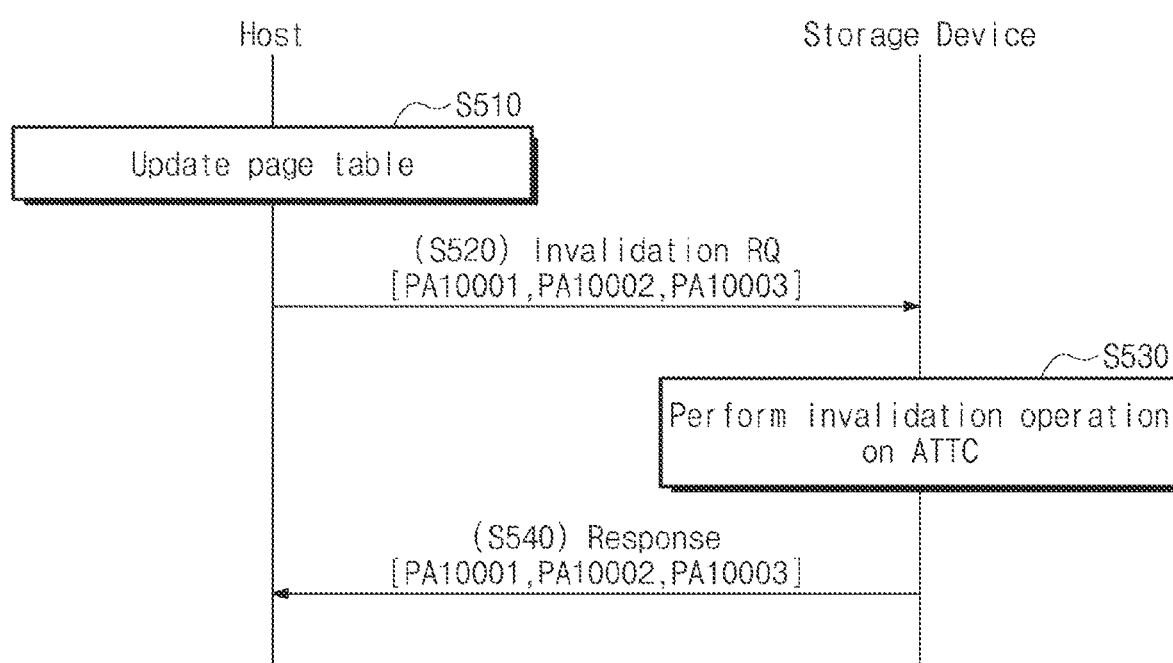

FIGS. 7A to 7C are diagrams illustrating operation examples of a storage system of FIG. 1. Referring to FIGS. 1 and 7A, in operation S310 the host 11 may update the page table PT. For example, a logical address corresponding to the physical address PA10001 may be changed. Alternatively, the logical address corresponding to the physical address PA10001 may be invalid.

In operation S320, the host 11 may send the invalidation request to the storage device 100. For example, the invalidation request may include an address to be invalidated. That is, the invalidation request may include the physical address PA10001. The host 11 may send the invalidation request including the physical address PA10001 for the purpose of deleting or flushing mapping information corresponding to the physical address PA10001 from among mapping information in the address translation table cache ATTC of the storage device 100.

In an embodiment, the host 11 may send a discard or invalidation request for mapping information by using the address translation services (ATS) of the PCIe. The host 11 may send the invalidation request for the mapping information through invalidation requests of the ATS. Alternatively, the host 11 may send the invalidation request by using the CXL (Compute eXpress Link)™ protocol (e.g., CXL-.cache). However, the present disclosure is not limited thereto.

In operation S330, the storage device 100 may perform an invalidation operation on the address translation table cache ATTC. For example, the storage device 100 may receive the invalidation request from the host 11. The storage device 100 may perform the invalidation operation on the address translation table cache ATTC based on the invalidation request. The storage device 100 may remove the mapping information corresponding to the physical address PA10001 included in the invalidation request. Alternatively, the storage device 100 may set the valid bit "V" corresponding to the physical address PA10001 so as to indicate the disable state (e.g., the first logical value of "0").

In operation S340, the storage device 100 may send a response corresponding to the invalidation request to the host 11. For example, the storage device 100 may send invalidation completion information about the physical address PA10001 to the host 11.

As described above, the host 11 may direct invalidation of one item of mapping information through one invalidation request. That is, the invalidation request may include one physical address PA to be invalidated in the address translation table cache ATTC. The storage device 100 may invalidate mapping information corresponding to one physical address based on one invalidation request. The storage device 100 may send completion information about the invalidated mapping information to the host 11 by using one response.

In an embodiment, referring to FIG. 7B, the storage device 100 may send completion information about a plurality of invalidation requests through one response. The host 11 may send a plurality of invalidation requests to the storage device 100. The storage device 100 may invalidate pieces of mapping information corresponding to a plurality of physical addresses based on the plurality of invalidation requests. The storage device 100 may send pieces of completion information about a plurality of invalidated mapping information to the host 11 by using one response.

In operation S410, the host 11 may update the page table PT. For example, the host 11 may update a logical address corresponding to the physical address PA10001, may update a logical address corresponding to the physical address PA10002, and may update a logical address corresponding to the physical address PA10003.

In operation S420, the host 11 may send the invalidation request including the physical address PA10001 to the storage device 100. In operation S430, the storage device 100 may perform the invalidation operation on mapping information of the address translation table cache ATTC, which corresponds to the physical address PA10001, in response to the invalidation request. In operation S440, the host 11 may send the invalidation request including the physical address PA10002 to the storage device 100. In operation S450, the storage device 100 may perform the invalidation operation on mapping information of the address translation table cache ATTC, which corresponds to the physical address PA10002, in response to the invalidation request. In operation S460, the host 11 may send the invalidation request including the physical address PA10003 to the storage device 100. In operation S470, the storage device 100 may perform the invalidation operation on mapping information of the address translation table cache ATTC, which corresponds to the physical address PA10003, in response to the invalidation request. In operation S480, the storage device 100 may send a response including invalidation completion information about the physical addresses PA10001, PA10002, and PA10003 to the host 11.

In an embodiment, referring to FIG. 7C, the host 11 may direct invalidation of a plurality of mapping information through one invalidation request. That is, the invalidation request may include a plurality of physical addresses to be invalidated in the address translation table cache ATTC. The storage device 100 may invalidate pieces of mapping information corresponding to the plurality of physical addresses based on one invalidation request. The storage device 100 may send pieces of completion information about a plurality of invalidated mapping information to the host 11 by using one response.

In operation S510, the host 11 may update the page table PT. For example, the host 11 may update a logical address corresponding to the physical address PA10001, may update a logical address corresponding to the physical address PA10002, and may update a logical address corresponding to the physical address PA10003.

In operation S520, the host 11 may send the invalidation request including the plurality of physical addresses PA10001, PA10002, and PA10003 to the storage device 100. In operation S530, the storage device 100 may perform the invalidation operation on pieces of mapping information of the address translation table cache ATTC, which correspond to the plurality of physical addresses PA10001, PA10002, and PA10003, in response to the invalidation request. In operation S540, the storage device 100 may send a response including invalidation completion information about the plurality of physical addresses PA10001, PA10002, and PA10003 to the host 11.

Figure 8:
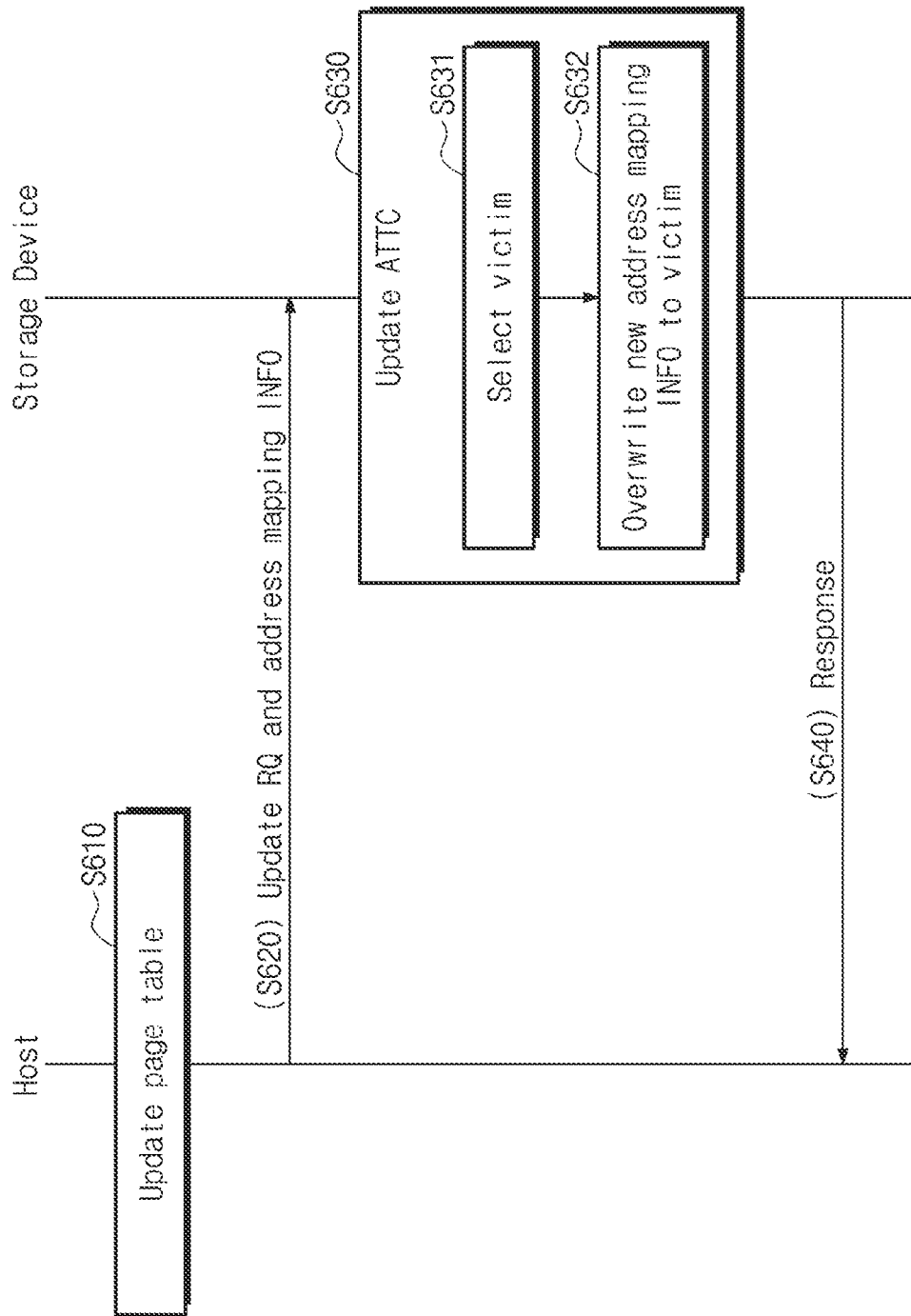
FIG. 8 is a diagram illustrating an example of an operation of a storage system of FIG. 1.

FIG. 8 is a diagram illustrating an example of an operation of a storage system of FIG. 1. Referring to FIGS. 1 and 8, instead of sending the translation request to the host 11, the storage device 100 may update the address translation table cache ATTC in response to an update request provided from the host 11. In operation S610, the host 11 may update the page table PT. For example, the host 11 may perform a mapping operation such that the physical address PA10001 is mapped onto the second logical address LA2, the physical address PA10002 is mapped onto the third logical address LA3, and the physical address PA10003 is mapped onto the first logical address LA1.

In operation S620, the host 11 may send the update request to the storage device 100. For example, the host 11 may send the update request such that mapping information about the plurality of physical addresses PA10001, PA10002, and PA10003 is updated in the address translation table cache ATTC of the storage device 100. The update request may include the plurality of physical addresses PA10001, PA10002, and PA10003 and pieces of mapping information (e.g., PA10001-LA2, PA10002-LA3, and PA10003-LA1) respectively corresponding to the plurality of physical addresses PA10001, PA10002, and PA10003.

In operation S630, the storage device 100 may update the address translation table cache ATTC in response to the update request. In operation S631, the storage device 100 may select victim entries. In operation S632, the storage device 100 may overwrite new address mapping information into the victim entries. Operation S631 and operation S632 may be similar to operation S151 and operation S152 of FIG. 5 and, thus, additional description will be omitted to avoid redundancy.

In operation S640, the storage device 100 may send a response corresponding to the update request to the host 11. For example, the storage device 100 may send a response including update status information to the host 11.

Figure 9A:
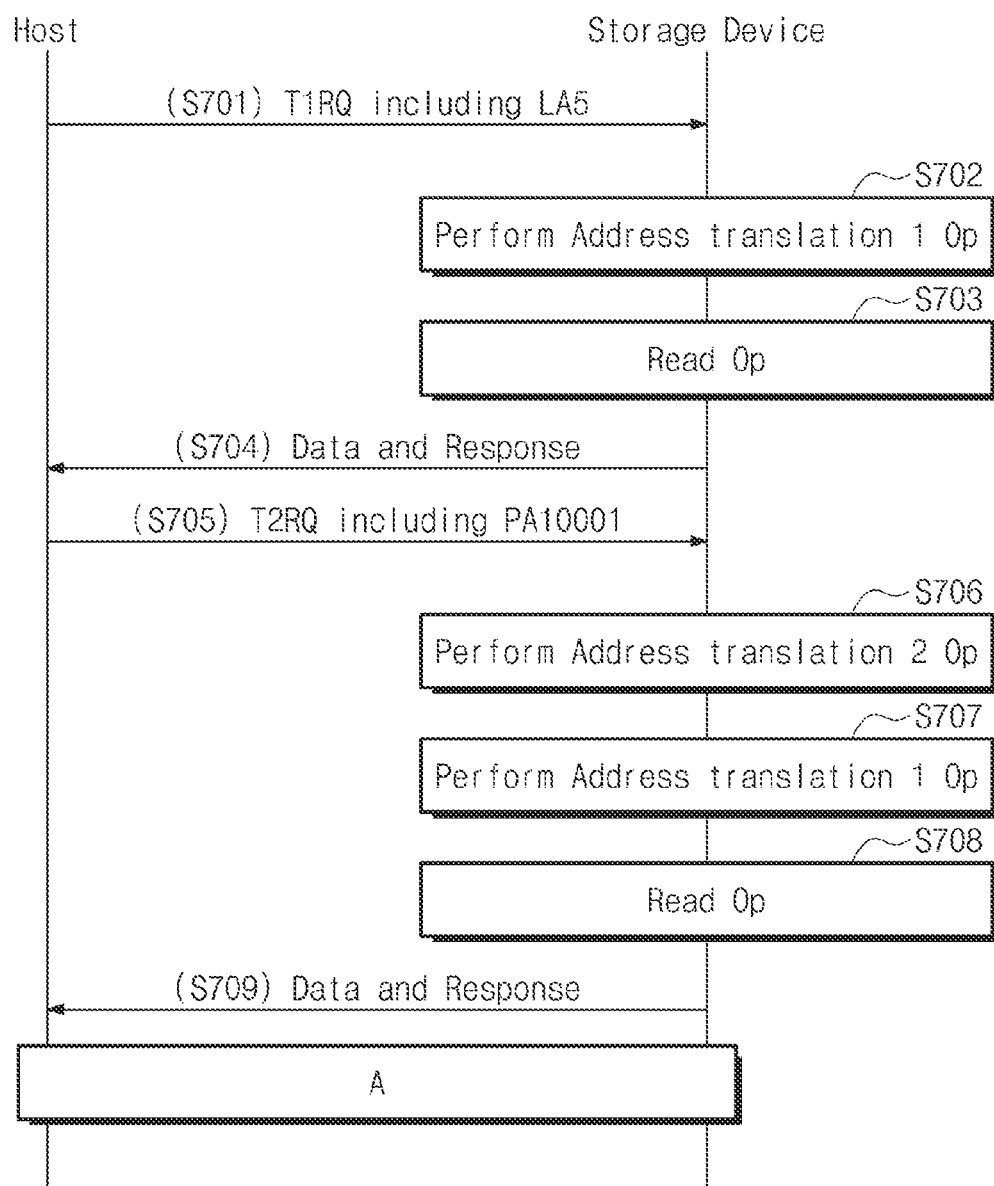
FIGS. 9A and 9B are diagrams illustrating an example of an operation of a storage system of FIG. 1.
Figure 9B:
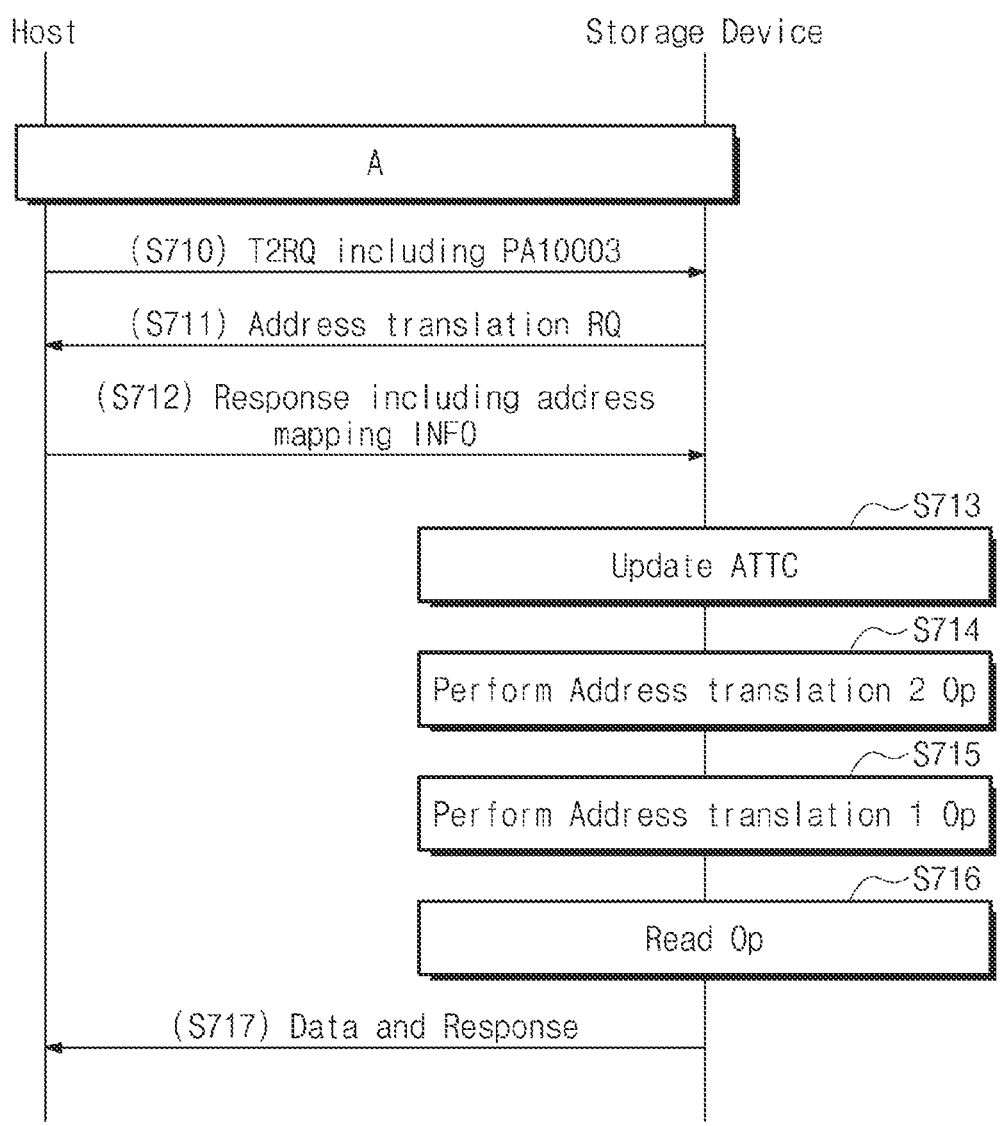

FIGS. 9A and 9B are diagrams illustrating an example of an operation of a storage system of FIG. 1. Referring to FIGS. 1, 6A to 6E, 9A, and 9B, in operation S701, the host 11 may send the first-type request T1RQ (e.g., the first-type read request) including the fifth logical address LA5 to the storage device 100. For example, the host controller 12 may add the first-type read request to a transmission queue of the host memory 13. The storage device 100 may fetch the first-type read request from the transmission queue of the host memory 13.

In operation S702, the storage device 100 may perform the first address translation operation. For example, the FTL 112 may determine the fifth logical address LA5 from the first-type request T1RQ. The FTL 112 may perform the first address translation operation on the fifth logical address LA5 with reference to the mapping table MT. That is, the FTL 112 may translate the fifth logical address LA5 into the third physical page address PPA3.

In operation S703, the storage device 100 may perform the read operation. For example, the FTL 112 may read data stored in the nonvolatile memory device 120 based on the third physical page address PPA3. The FTL 112 may send the read command including the third physical page address PPA3 to the nonvolatile memory device 120 and may receive the third data D3 corresponding to the third physical page address PPA3 from the nonvolatile memory device 120.

In operation S704, the storage device 100 may send the data corresponding to the first-type request T1RQ and a response to the host 11. For example, the storage device 100 may write the data of the block or page unit corresponding to the first-type request T1RQ in the host memory 13. The storage device 100 may write the completion entry corresponding to the first-type request T1RQ in the host memory 13. The storage device 100 may send an interrupt signal to the host 11.

In operation S705, the host 11 may send the second-type request T2RQ (e.g., the second-type read request) including the physical address PA10001 to the storage device 100. In operation S706, the storage device 100 may perform the second address translation operation. For example, the mapping cache manager 118 may determine the physical address PA10001 from the second-type request T2RQ. The mapping cache manager 118 may perform the second address translation operation on the physical address PA10001 with reference to the address translation table cache ATTC. The mapping cache manager 118 may determine whether mapping information about the physical address PA10001 is present in the address translation table cache ATTC. When the mapping information about the physical address PA10001 is present in the address translation table cache ATTC (when the cache hit occurs), the mapping cache manager 118 may perform the second address translation operation on the physical address PA10001. That is, the mapping cache manager 118 may translate the physical address PA10001 into the second logical address LA2 with reference to the address translation table cache ATTC.

In operation S707, the storage device 100 may perform the first address translation operation. For example, the FTL 112 may receive the second logical address LA2 from the mapping cache manager 118. The FTL 112 may perform the first address translation operation on the second logical address LA2 with reference to the mapping table MT. The FTL 112 may translate the second logical address LA2 into the fourth physical page address PPA4.

In operation S708, the storage device 100 may perform the read operation. For example, the FTL 112 may read data stored in the nonvolatile memory device 120 based on the fourth physical page address PPA4. In operation S709, the storage device 100 may send the data corresponding to the second-type request T2RQ and a response to the host 11. For example, the storage device 100 may send, to the host 11, data whose size is smaller than the block or page unit and which corresponds to the second-type request T2RQ.

In operation S710, the host 11 may send the second-type request T2RQ (e.g., the second-type read request) including the physical address PA10003 to the storage device 100. In operation S711, the storage device 100 may send the translation request to the host 11. For example, the mapping cache manager 118 may determine the physical address PA10003 from the second-type request T2RQ. The mapping cache manager 118 may determine whether mapping information about the physical address PA10003 is present in the address translation table cache ATTC. When the mapping information about the physical address PA10003 is absent from the address translation table cache ATTC (when the cache miss occurs), the mapping cache manager 118 may send the translation request including the physical address PA10003 to the host 11.

In operation S712, the host 11 may send a response including address mapping information to the storage device 100. For example, when the translation request is received, the host 11 may perform the address translation operation with reference to the page table PT. In other words, the host 11 may determine the physical address PA10003 from the translation request and may perform the address translation operation on the physical address PA10003. The host 11 may determine whether the storage device 100 is capable of accessing data corresponding to the physical address PA10003. When it is determined that the storage device 100 is capable of accessing data corresponding to the physical address PA10003, the host 11 may translate the physical address PA10003 into the first logical address LA1 with reference to the physical address PA. The host 11 may send the translation completion including the first logical address LA1 to the storage device 100.

In operation S713, the storage device 100 may update the address translation table cache ATTC in response to the translation completion. For example, the mapping cache manager 118 may cache mapping information about the physical address PA10003. The mapping cache manager 118 may store the first logical address LA1 in the address translation table cache ATTC so as to be correlated with the physical address PA10003.

In operation S714, the storage device 100 may perform the second address translation operation. For example, the mapping cache manager 118 may perform the second address translation operation on the physical address PA10003 with reference to the address translation table cache ATTC. The mapping cache manager 118 may translate the physical address PA10003 into the first logical address LA1.

In operation S715, the storage device 100 may perform the first address translation operation. For example, the FTL 112 may perform the first address translation operation on the first logical address LA1 with reference to the mapping table MT. The FTL 112 may translate the first logical address LA1 into the second physical page address PPA2.

In operation S716, the storage device 100 may perform the read operation. For example, the FTL 112 may read data stored in the nonvolatile memory device 120 based on the second physical page address PPA2. In operation S717, the storage device 100 may send the data corresponding to the second-type request T2RQ and a response to the host 11. For example, the storage device 100 may send, to the host 11, data whose size is smaller than the block or page unit and which corresponds to the second-type request T2RQ.

Figure 10:
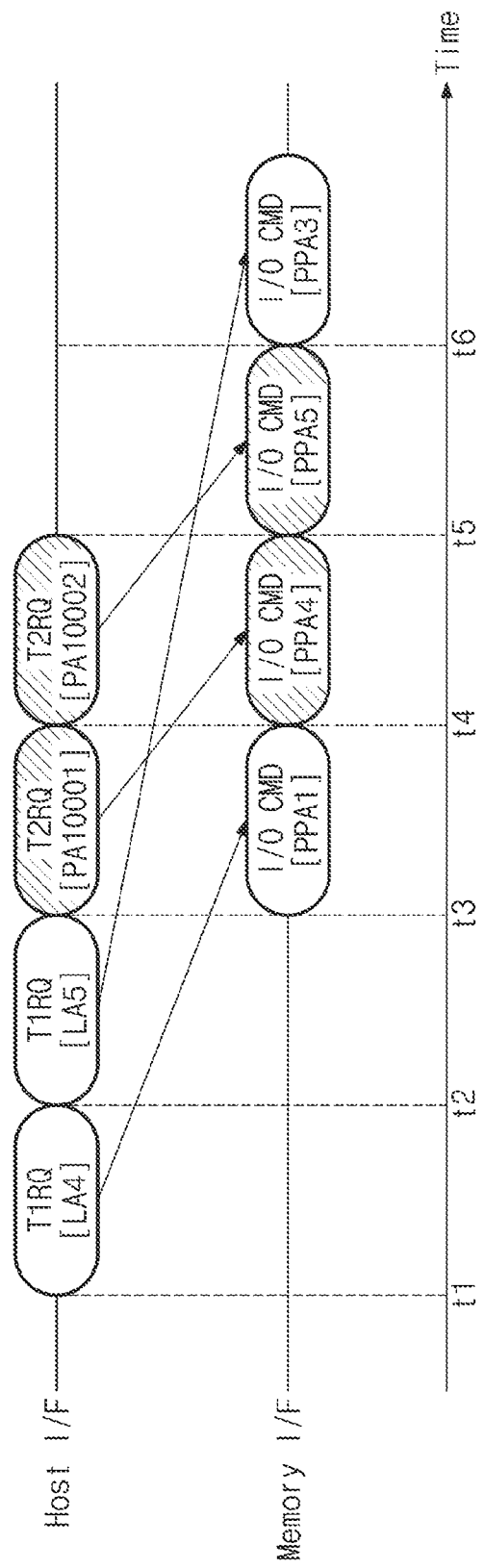
FIG. 10 is a diagram for describing a scheduling operation of a storage device of FIG. 1.

FIG. 10 is a diagram for describing a scheduling operation of a storage device of FIG. 1. Referring to FIGS. 1, 6E, and 10, the request scheduler 119 may schedule (or order) requests received from the host 11. The storage device 100 may process the requests based on a result of scheduling the requests.

In an embodiment, the storage controller 110 according to the present disclosure may receive the first-type request T1RQ and the second-type request T2RQ. The first-type request T1RQ may be processed by the page unit or the block unit, and the second-type request T2RQ may be processed by a unit (e.g., a byte unit or a cache line unit) smaller than the block unit or the page unit. A latency of the first-type request T1RQ may be greater than a latency of the second-type request T2RQ. In the case where requests are processed in the order of receiving the requests, the latency of the second-type request T2RQ may excessively increase due to the first-type request T1RQ.

In an embodiment, in the first-type request T1RQ the throughput may be more important than the latency; in the second-type request T2RQ, the latency may be more important than the throughput. As such, the request scheduler 119 may schedule requests such that the throughput increases with regard to the first-type request T1RQ and the latency decreases with regard to the second-type request T2RQ.

From the host 11, the storage controller 110 may receive the first-type request T1RQ (e.g., the first-type input/output request) including the fourth logical address LA4 at a first point in time t1, may receive the first-type request T1RQ including the fifth logical address LA5 at a second point in time t2, may receive the second-type request T2RQ (e.g., the second-type input/output request) including the physical address PA10001 at a third point in time t3, and may receive the second-type request T2RQ including the physical address PA10002 at a fourth point in time t4.

The storage controller 110 may not process the requests in the order of receiving the requests from the host 11, but it may schedule the requests. That is, the storage controller 110 may process the requests to be different from the order of receiving the requests.

In an embodiment, the storage controller 110 may set the second-type request T2RQ so as to have a higher priority than the first-type request T1RQ. That is, the storage controller 110 may first process the second-type request T2RQ before the first-type request T1RQ. As such, the storage controller 110 may provide the nonvolatile memory device 120 with input/output commands as follows: 1) an input/output command including the first physical page address PPA1 corresponding to the fourth logical address LA4 at the third point in time t3, 2) an input/output command including the fourth physical page address PPA4 corresponding to the physical address PA10001 at the fourth point in time t4, 3) an input/output command including the fifth physical page address PPA5 corresponding to the physical address PA10002 at a fifth point in time t5, and 4) an input/output command including the third physical page address PPA3 corresponding to the fifth logical address LA5 at a sixth point in time t6.

That is, because the priority of the second-type request T2RQ is high, even though the storage controller 110 receives the first-type request T1RQ including the fifth logical address LA5 before the second-type request T2RQ including the physical address PA10001 and the second-type request T2RQ including the physical address PA10002, the storage controller 110 may first process the second-type request T2RQ including the physical address PA10001 and the second-type request T2RQ including the physical address PA10002 before the first-type request T1RQ including the fifth logical address LA5.

Figure 11:
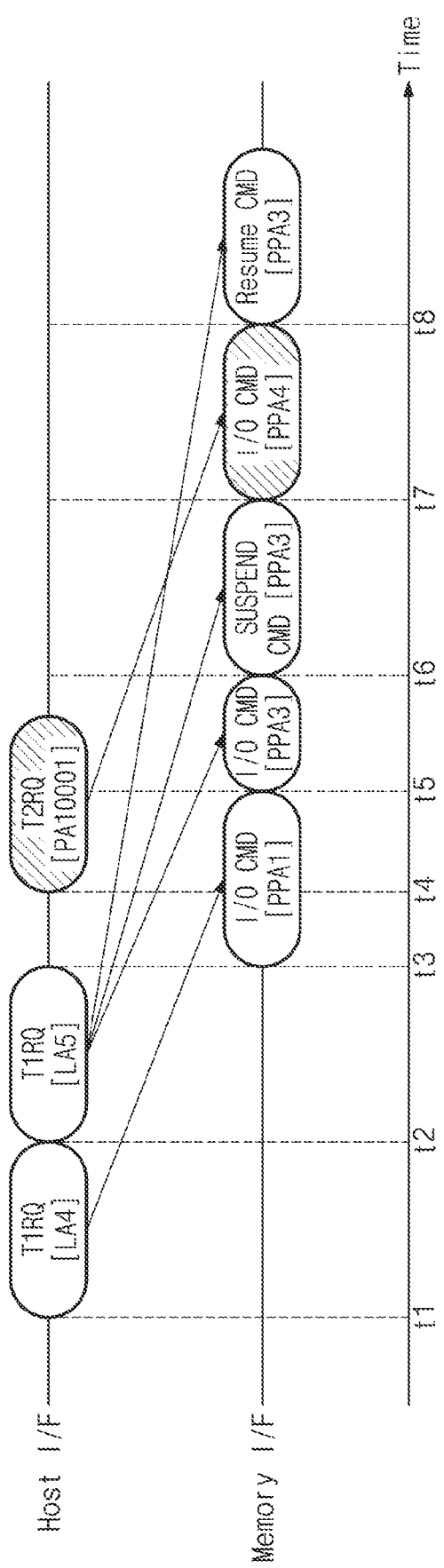
FIG. 11 is a diagram for describing a scheduling operation of a storage device of FIG. 1.

FIG. 11 is a diagram for describing a scheduling operation of a storage device of FIG. 1. Referring to FIGS. 1 and 11, the storage controller 110 may send a suspend command and a resume command to the nonvolatile memory device 120 for the purpose of scheduling requests.

From the host 11, the storage controller 110 may receive the first-type request T1RQ including the fourth logical address LA4 at a first point in time t1, may receive the first-type request T1RQ including the fifth logical address LA5 at a second point in time t2, and may receive the second-type request T2RQ including the physical address PA10001 at a fourth point in time t4.

As such, the storage controller 110 may provide the nonvolatile memory device 120 with commands as follows: 1) an input/output command including the first physical page address PPA1 corresponding to the fourth logical address LA4 at a third point in time t3, 2) an input/output command including the third physical page address PPA3 corresponding to the fifth logical address LA5 at a fifth point in time t5, 3) the suspend command including the third physical page address PPA3 at a sixth point in time t6, 4) an input/output command including the fourth physical page address PPA4 corresponding to the physical address PA10001 at a seventh point in time t7, and 5) the resume command including the third physical page address PPA3 at an eighth point in time t8.

Because the priority of the second-type request T2RQ is higher than the priority of the first-type request T1RQ, the storage controller 110 may suspend the first-type request T1RQ being processed and may first process the second-type request T2RQ. That is, because the storage controller 110 receives the second-type request T2RQ including the physical address PA10001 while processing the first-type request T1RQ including the fifth logical address LA5, the storage controller 110 may send the suspend command including the third physical page address PPA3 to the nonvolatile memory device 120. The nonvolatile memory device 120 may suspend an operation being performed in response to the suspend command. Afterwards, the storage controller 110 may process the second-type request T2RQ and may then send the resume command including the third physical page address PPA3 to the nonvolatile memory device 120. The nonvolatile memory device 120 may resume the suspended operation in response to the resume command.

As described above, in the case where the storage device 100 receives a request of a type having a high priority, the storage device 100 may suspend an operation associated with a request being currently processed and may first process the request of the type having the high priority. Accordingly, a storage device with improved performance is provided.

Figure 12A:
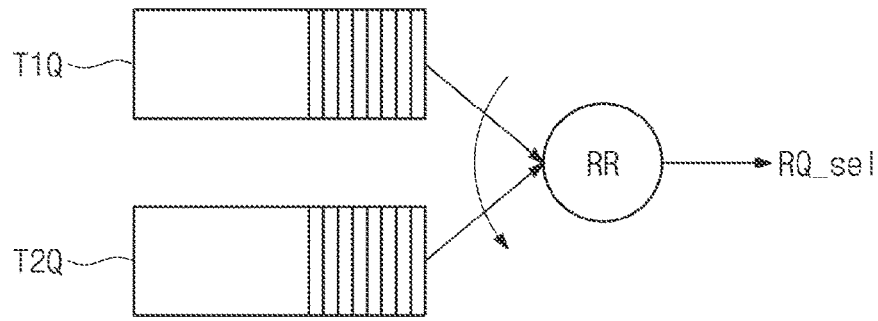
FIGS. 12A to 12D are diagrams for describing a request processing order of a storage device of FIG. 1.

FIGS. 12A to 12D are diagrams for describing a request processing order of a storage device of FIG. 1. Referring to FIGS. 1 and 12A, the storage system 10 may manage a first-type queue T1Q and a second-type queue T2Q. For example, the first-type queue T1Q and the second-type queue T2Q may be stored in the buffer memory 115. The first-type requests T1RQ may be added to the first-type queue T1Q. The second-type requests T2RQ may be added to the second-type queue T2Q.

The storage controller 110 may select one of requests included in a plurality of queues T1Q and T2Q based on a round robin (RR) scheme and may process the selected request RQ_sel.

Figure 12B:
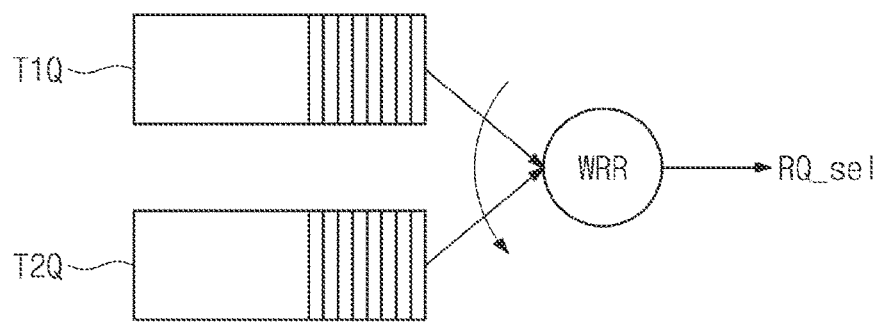

Referring to FIG. 12B, the storage system 10 may manage the first-type queue T1Q and the second-type queue T2Q. The storage controller 110 may select one of requests included in a plurality of queues T1Q and T2Q based on a weighted round robin (WRR) scheme and may process the selected request RQ_sel. In an embodiment, the plurality of queues T1Q to T2Q may have weights, respectively. A weight may include an urgent weight, a high weight, a medium weight, and a low weight. For example, the first-type queue T1Q may be set to have the low weight, and the second-type queue T2Q may be set to have the medium weight. The weights of the plurality of queues T1Q to T2Q may be determined in advance. Alternatively, the weights of the plurality of queues T1Q and T2Q may be determined or managed by the host 11 (for example, weight values may be changed during an operation).

Figure 12C:
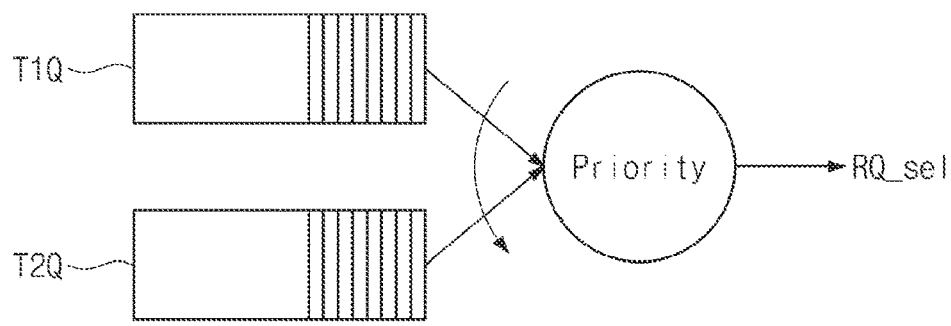

Referring to FIG. 12C, the storage system 10 may manage the first-type queue T1Q and the second-type queue T2Q. The storage controller 110 may select one of requests included in a plurality of queues T1Q and T2Q based on a priority scheme and may process the selected request RQ_sel. That is, the storage controller 110 may first process requests included in the second-type queue T2Q before requests included in the first-type queue T1Q.

Figure 12D:
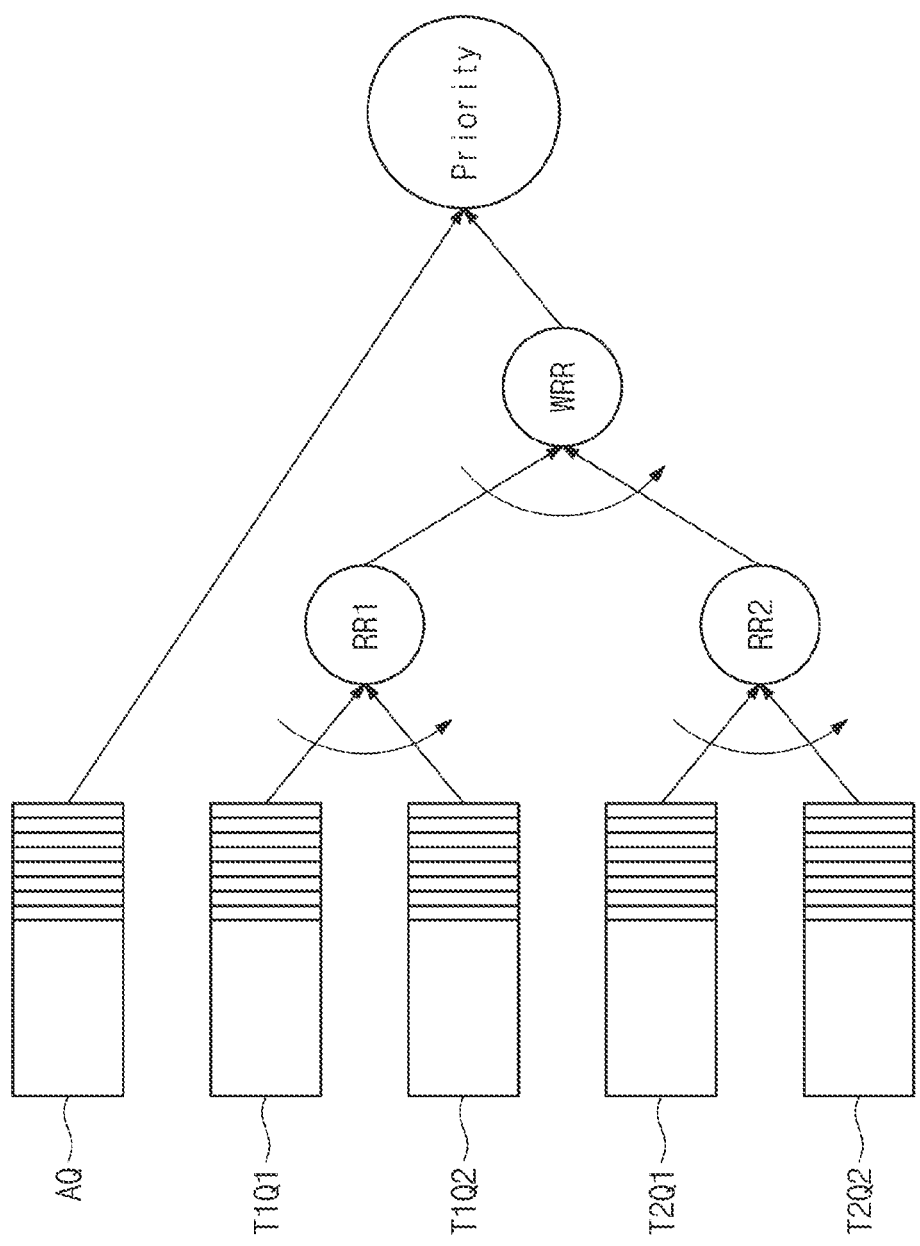

Referring to FIG. 12D, the storage system 10 may manage an admin queue AQ, a plurality of first-type queues T1Q1 and T1Q2, and a plurality of second-type queues T2Q1 and T2Q2. For example, the first-type queue T1Q1 may store read requests of the first-type requests T1RQ and the first-type queue T1Q2 may store write requests of the first-type requests T1RQ. The second-type queue T2Q2 may store read requests of the second-type requests T2RQ, and the second-type queue T2Q2 may store write requests of the second-type requests T2RQ.

Alternatively, for example, the first-type requests T1RQ provided from a first host of the plurality of hosts may be added to the first-type queue T1Q1 and the second-type requests T2RQ provided from a second host of the plurality of hosts may be added to the first-type queue T1Q2. The second-type requests T2RQ provided from the first host may be added to the second-type queue T2Q1, and the second-type requests T2RQ provided from the second host may be added to the second-type queue T2Q2.

In an embodiment, the storage controller 110 may first process requests of the admin queue AQ based on a priority scheme. Afterwards, based on the weighted round robin (WRR) scheme, the storage controller 110 may select requests from the second-type queues T2Q1 and T2Q2 having the medium weight, and may select requests from the first-type queues T1Q1 and T1Q2 having the low weight. A request to be processed may be selected from the requests from the second-type queues T2Q1 and T2Q2 having the medium weight by a second round robin scheme RR2, and a request to be processed may be selected from the requests from the first-type queues T1Q1 and T1Q2 having the low weight by a first round robin scheme RR1. As described above, the storage controller 110 may manage priorities or weights of a plurality of queues and may perform arbitration depending on various schemes.

Figure 13:
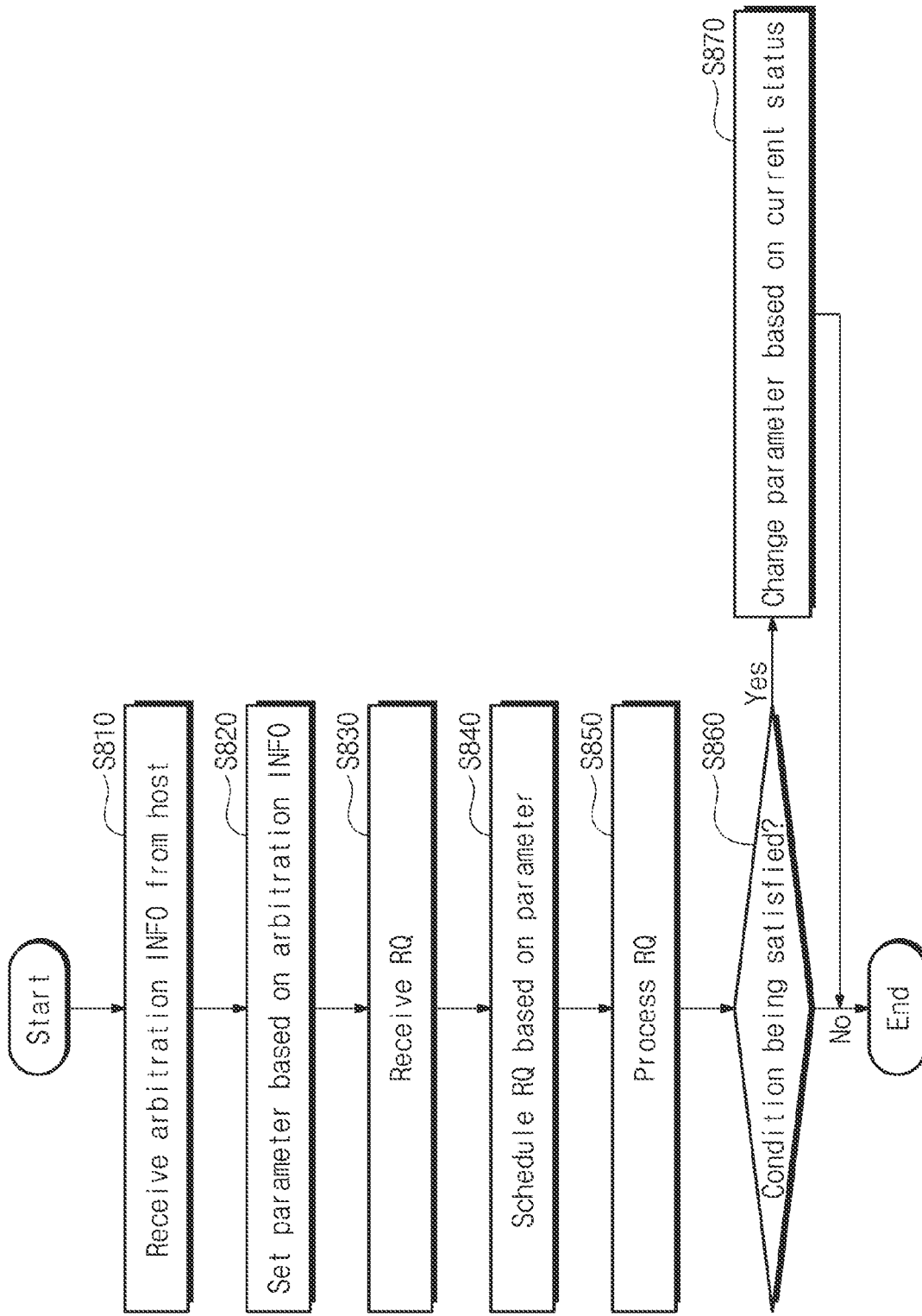
FIG. 13 is a flowchart illustrating an example of an operation of a storage device of FIG. 1.

FIG. 13 is a flowchart illustrating an example of an operation of a storage device of FIG. 1. FIG. 14 is a diagram illustrating an example of arbitration information. Referring to FIGS. 1, 13, and 14, in operation S810, the storage device 100 may receive the arbitration information from the host 11. A given level of performance may be required depending on a request type. The storage device 100 may receive the arbitration information about a request type.

In an embodiment, the storage device 100 may receive the arbitration information as illustrated in FIG. 14. For example, the arbitration information may include information about minimum performance, maximum performance, minimum latency, and maximum latency for each request type. The minimum performance refers to information about minimum performance required by a host, the maximum performance refers to information about maximum performance required by the host, the minimum latency refers to information about minimum latency required by the host, and the maximum latency refers to information about maximum latency required by the host.

For example, the minimum information of the arbitration information may include information about minimum write performance WB_MIN1 and WB_MIN2, minimum read performance RB_MIN1 and RB_MIN2, minimum write latencies WL_MIN1 and WL_MIN2, and minimum read latencies RL_MIN1 and RL_MIN2 for each request type. The maximum information of the arbitration information may include information about maximum write performance WB_MAX1 and WB_MAX2, maximum read performance RB_MAX1 and RB_MAX2, maximum write latencies WL_MAX1 and WL_MAX2, and maximum read latencies RL_MAX1 and RL_MAX2 for each request type.

In an embodiment, the arbitration information may be received from the host 11 in an initialization process or a first communication process. The arbitration information may be provided from the host 11 to the storage device 100 through vendor commands or a set-feature command of the NVMe protocol. Alternatively, the arbitration information may be provided from the host 11 to the storage device 100 through the CXL protocol. For example, the host 11 may provide the arbitration information to the storage device 100 by setting a memory mapped PCI register.

In operation S820, the storage device 100 may determine an arbitration scheme based on the arbitration information and may set parameters according to the arbitration scheme. For example, the storage controller 110 may determine the weighted round robin (WRR) scheme of the plurality of arbitration schemes based on the arbitration information. The storage controller 110 may set weights of the parameters of the weighted round robin scheme. For example, the storage controller 110 may set the weight of the first-type request T1RQ to the low weight and may set the weight of the second-type request T2RQ to the medium weight.

In operation S830, the storage device 100 may receive requests from the host 11. In operation S840, the storage device 100 may schedule the requests based on the set parameters. For example, referring to FIG. 10, the storage controller 110 may receive the first-type request T1RQ including the fifth logical address LA5 at the second point in time t2 and may receive the second-type request T2RQ including the physical address PA10001 at the third point in time t3. Because the weight of the second-type request T2RQ is higher than the weight of the first-type request T1RQ, the storage controller 110 may perform scheduling such that the second-type request T2RQ including the physical address PA10001 is first processed before the first-type request T1RQ including the fifth logical address LA5.

In operation S850, the storage device 100 may process the requests based on a scheduling result. For example, referring to FIG. 10, the storage controller 110 may send an input/output command (i.e., corresponding to the second-type request T2RQ) including the fourth physical page address PPA4 to the nonvolatile memory device 120 at the fourth point in time t4 and may send an input/output command (i.e., corresponding to the first-type request T1RQ) including the third physical page address PPA3 to the nonvolatile memory device 120 at the sixth point in time t6.

In operation S860, the storage device 100 may determine whether a condition is satisfied. The storage controller 110 may determine whether a condition of needing to change a parameter(s) associated with arbitration is satisfied. For example, when information about a ratio of a cache miss and a cache hit received from the mapping cache manager 118 reaches a threshold value, the condition may be satisfied. When the changed arbitration information is received from the host 11, the storage controller 110 may determine that the condition is satisfied. The storage controller 110 may determine whether a condition of needing to change a parameter(s) is satisfied based on states of current input/output requests, a change of QoS settings, and/or information about a ratio of a cache miss and a cache hit. However, the present disclosure is not limited thereto. For example, the condition may be variously changed or modified depending on an implementation. The storage device 100 performs operation S870 when the condition is satisfied and does not perform the following operation(s) when the condition is not satisfied.

In operation S870, the storage device 100 may change the parameter based on the current status. For example, in consideration of the arbitration information, current status information (e.g., an input/output state or information about a ratio of a cache miss and a cache hit) or an environment variable (e.g., QoS settings), the storage controller 110 may change the arbitration scheme or may change the parameter(s) associated with arbitration. For example, in the case where a ratio of a cache miss is high, to decrease the ratio of the cache miss the storage controller 110 may change the weight of the second-type request T2RQ from the medium weight to the high weight.

As described above, the storage device 100 may schedule requests and may change the arbitration scheme and parameters if necessary. As such, the storage device 100 may satisfy the performance or latency requirements of the host 11. Accordingly, a storage device with improved performance is provided.

Figure 15:
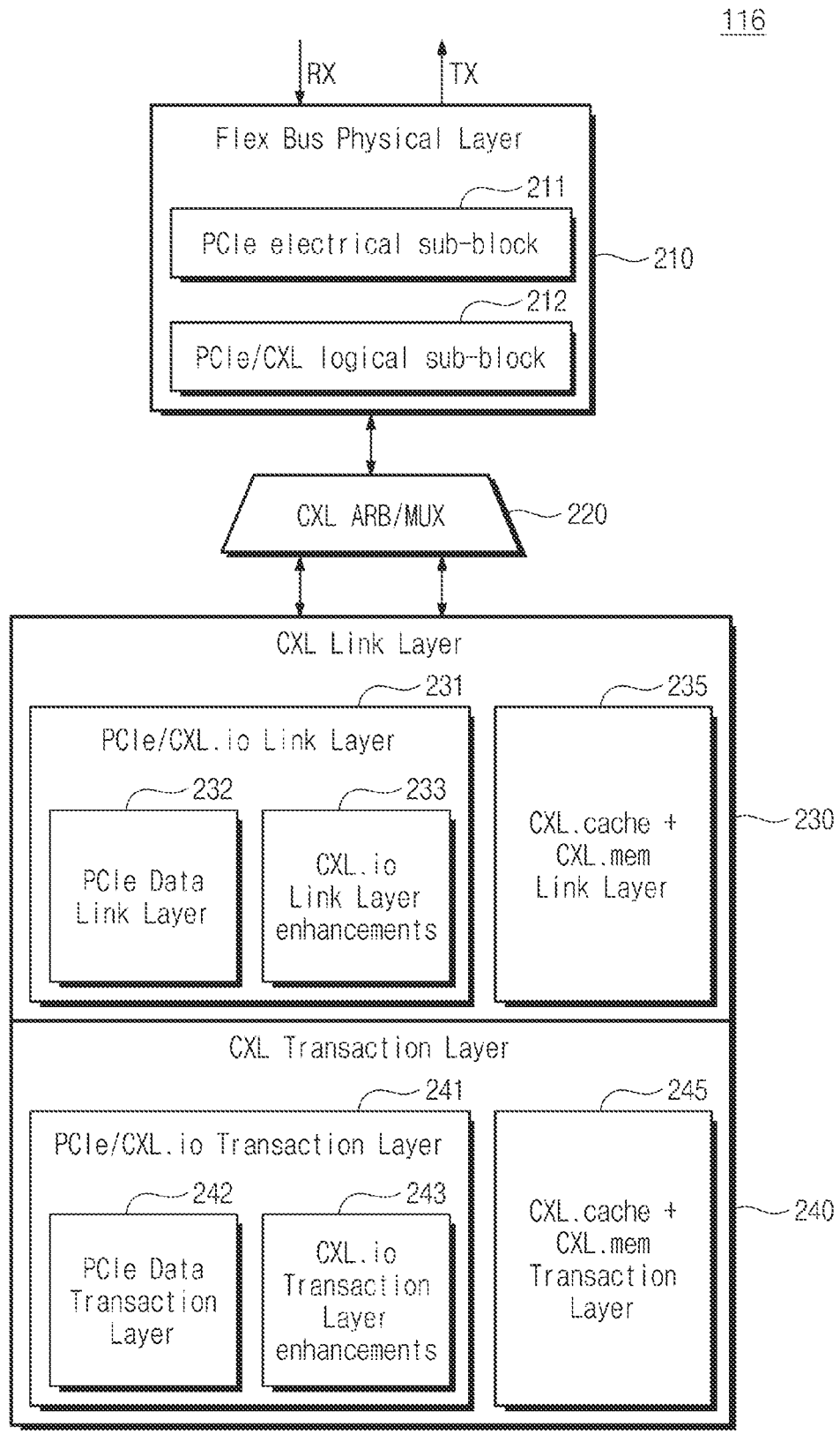
FIG. 15 is a block diagram illustrating an example of a multi-protocol host interface circuit of FIG. 1.

FIG. 15 is a block diagram illustrating an example of a multi-protocol host interface circuit of FIG. 1. The multi-protocol host interface circuit 116 may be implemented based on the CXL™. The multi-protocol host interface circuit 116 may include a flex bus physical layer 210, a CXL arbiter/multiplexer (XCL ARB/MUX) 220, a CXL link layer 230, and a CXL transaction layer 240.

The flex bus physical layer 210 may include a PCIe electrical sub-block 211 and a PCIe/CXL logical sub-block 212. The PCIe electrical sub-block 211 may be used in common by the PCIe© and the CXL™.

The PCIe/CXL logical sub-block 212 may enter a PCIe© mode in initial link training; in recovery defined by the PCIe©, depending on the mode negotiation, the PCIe/CXL logical sub-block 212 may enter a CXL™ mode or may be recovered to the PCIe© mode.

The CXL arbiter/multiplexer 220 may transfer the first-type request T1RQ transferred from the flex bus physical layer 210 in the PCIe© mode and/or associated with an input and output I/O in the CXL™ mode to a PCIe/CXL.io link layer 231 of the CXL link layer 230. The CXL arbiter/multiplexer 220 may transfer the second-type request T2RQ, which is associated with a cache and/or memory and is transferred from the flex bus physical layer 210 in the CXL™ mode, to a CXL.cache+CXL.mem link layer 235 of the CXL link layer 230.

The PCIe/CXL.io link layer 231 may include a PCIe data link layer 232 and a CXL.io link layer enhancements 233. The PCIe data link layer 232 may function as a data link layer in the PCIe© mode. The CXL.io link layer enhancements 233 may function as a data link layer associated with the input and output io in the CXL™ mode.

The CXL transaction layer 240 may function based on the CXL link layer 230. The CXL transaction layer 240 may include a PCIe/CXL.io transaction layer 241, and a CXL.Cache+CXL.mem transaction layer 245. The PCIe/CXL.io transaction layer 241 may include a PCIe data transaction layer 242 and a CXL.io transaction layer enhancements 243.

The PCIe data transaction layer 242 may function based on the PCIe data link layer 232. The CXL.io transaction layer enhancements 243 may function based on the CXL.io link layer enhancements 233. The CXL.Cache+CXL.mem transaction layer 245 may function based on the CXL.cache+CXL.mem link layer 235.

Figure 16:
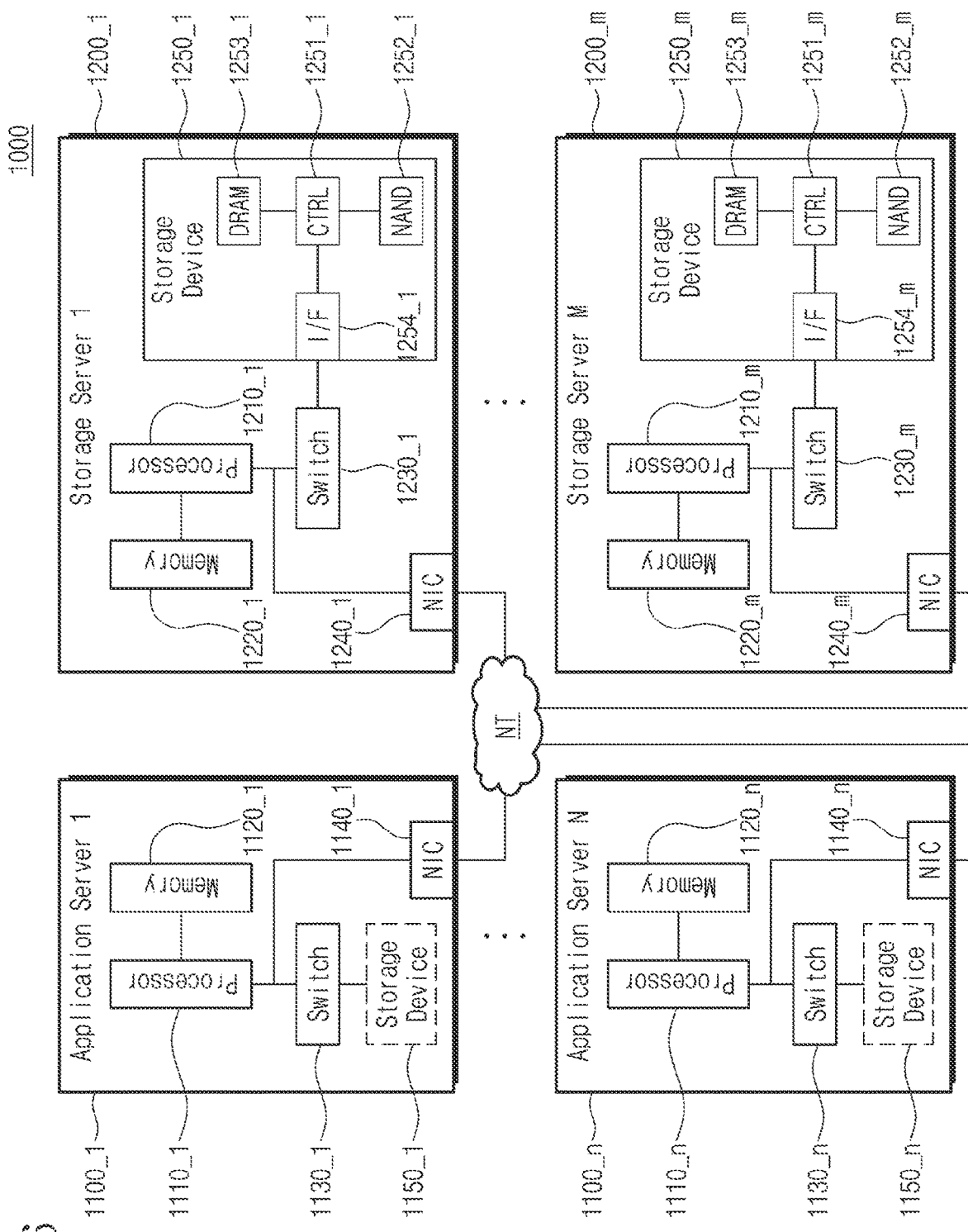
FIG. 16 is a block diagram illustrating a data center to which a storage device according to an embodiment of the present disclosure is applied.

FIG. 16 is a diagram of a data center 1000 to which a memory device is applied according to an embodiment. Referring to FIG. 16, the data center 1000 may be a facility that collects various types of pieces of data and provides services and may be referred to as a data storage center. The data center 1000 may be a system for operating a search engine and a database and may be a computing system used by companies, such as banks, or government agencies. The data center 1000 may include application servers 1100_1 to 1100_n and storage servers 1200_1 to 1200_m. The number of application servers 1100_1 to 1100_n and the number of storage servers 1200_1 to 1200_m may be variously selected according to embodiments. The number of application servers 1100_1 to 1100_n may be different from the number of storage servers 1200_1 to 1200_m.

Below, for convenience of description, an embodiment of the first storage server 1200_1 will be described. Each of the other storage servers 1200_2 to 1200_m and the plurality of application servers 1100_1 to 1100_n may have a similar configuration or structure of the first storage server 1200_1.

The storage server 1200_1 may include at least one of processor 1210_1, a memory 1220_1, a network interface card (NIC) 1240_1, and a storage device 1250_1. The processor 1210_1 may control all operations of the storage server 1200_1, access the memory 1220_1, and execute instructions and/or data loaded in the memory 1220_1. The memory 1220_1 may be a double-data-rate synchronous DRAM (DDR SDRAM), a high-bandwidth memory (HBM), a hybrid memory cube (HMC), a dual in-line memory module (DIMM), an Optane DIMM, and/or a non-volatile DIMM (NVMDIMM).

In some embodiments, the numbers of processors 1210_1 and memories 1220_1 included in the storage server 1200_1 may be variously selected. In an embodiment, the processor 1210_1 and the memory 1220_1 may provide a processor-memory pair. In an embodiment, the number of processors 1210_1 may be different from the number of memories 1220_1. The processor 1210_1 may include a single-core processor or a multi-core processor.

The switch 1230_1 may selectively connect the processor 1210_1 to the storage device 1250_1 or selectively connect the NIC 1240_1 to the storage device 1250_1 via the control of the processor 1210_1.

The NIC 1240_1 may be configured to connect the first storage server 1200_1 with the network NT. In an embodiment, the NIC 1240_1 may include a network interface card and a network adaptor. The NIC 1240_1 may be connected to the network NT by a wired interface, a wireless interface, a Bluetooth interface, or an optical interface. The NIC 1240_1 may include an internal memory, a digital signal processor (DSP), and a host bus interface and may be connected to the processor 1210_1 and/or the switch 1230_1 through the host bus interface. The host bus interface may be implemented as one of the above-described examples of the interface 1254_1, such as an ATA, an SATA, an e-SATA, an SCSI, an SAS, a PCI, a PCIe, an NVMe, an IEEE 1394, an USB interface, an SD card interface, an MMC interface, an eMMC interface, a UFS interface, an eUFS interface, and/or a CF card interface. In an embodiment, the NIC 1240_1 may be integrated with at least one of the processor 1210_1, the switch 1230_1, and the storage device 1250_1.

The storage device 1250_1 may store or read out data under the control of the processor 1210_1. The storage device 1250_1 may include a controller 1251_1, a nonvolatile memory 1252_1, DRAM 1253_1, and an interface 1254_1. In an embodiment, the storage device 1250_1 may include a secure element (SE) for security or privacy.

The controller 1251_1 may control all operations of the storage device 1250_1. In an embodiment, the controller 1251_1 may include SRAM. The controller 1251_1 may write data to the nonvolatile memory 1252_1 in response to a write command or read data from the nonvolatile memory device 1252_1 in response to a read command In an embodiment, the controller 1252_1 may be configured to control the nonvolatile memory 1252_1 based on a Toggle interface or an ONFI interface.

The DRAM 1253_1 may temporarily store (or buffer) data to be written to the nonvolatile memory 1252_1 or data read from the nonvolatile memory 1252_1. Also, the DRAM 1253_1 may store data necessary for the controller 1251_1 to operate, such as metadata or mapping data. The interface 1254_1 may provide a physical connection between the at least one of processor 1210_1, the memory 1220_1, the network interface card (NIC) 1240_1, and the controller 1251_1. In an embodiment, the interface 1254_1 may be implemented using a direct attached storage (DAS) scheme in which the storage device 1250_1 is directly connected with a dedicated cable. In an embodiment, the interface 1254_1 may be implemented by using various interface schemes, such as an ATA, an SATA, an e-SATA, an SCSI, an SAS, a PCI, a PCIe, an NVMe, an IEEE 1394, a USB interface, an SD card interface, an MMC interface, an eMMC interface, a UFS interface, an eUFS interface, and/or a CF card interface.

The above configuration of the storage server 1200_1 is a simple example, and the present disclosure is not limited thereto. The above configuration of the storage server 1200_1 may be applied to each of other storage servers or the plurality of application servers. In an embodiment, in each of the plurality of application servers 1100_1 to 1100_n, the storage device may be selectively omitted.

The application servers 1100_1 to 1100_n may communicate with the storage servers 1200_1 to 1200_m through a network NT. The network NT may be implemented by using a fiber channel (FC) or Ethernet. In this case, the FC may be a medium used for relatively high-speed data transmission and use an optical switch with high performance and high availability. The storage servers 1200_1 to 1200_m may be provided as file storages, block storages, or object storages according to an access method of the network NT.

In an embodiment, the network NT may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to an SCSI over TCP/IP or Internet SCSI (iSCSI) protocol. In another embodiment, the network 2300 may be a general network, such as a TCP/IP network. For example, the network 2300 may be implemented according to a protocol, such as FC over Ethernet (FCoE), network attached storage (NAS), and NVMe over Fabrics (NVMe-oF).

In an embodiment, at least one of the plurality of application servers 1100_1 to 1100_n may be configured to access at least another one of the plurality of application servers 1100_1 to 1100_n or at least one of the plurality of storage servers 1200_1 to 1200_m.

For example, the application server 1100_1 may store data, which is requested by a user or a client to be stored, in one of the storage servers 1200_1 to 1200_m through the network NT. Also, the application server 1100_1 may obtain data, which is requested by the user or the client to be read, from one of the storage servers 1200_1 to 1200_m through the network NT. For example, the application server 1100_1 may be implemented as a web server or a database management system (DBMS).

The application server 1100_1 may access a memory 1120_n or a storage device 1150_n, which is included in another application server 1100_n, through the network NT. Alternatively, the application server 1100_1 may access memories 1220_1 to 1220_m or storage devices 1250_1 to 1250_m, which are included in the storage servers 1200_1 to 1200_m, through the network NT. Thus, the application server 1100_1 may perform various operations on data stored in application servers 1100_1 to 1100_n and/or the storage servers 1200_1 to 1200_m. For example, the application server 1100_1 may execute an instruction for moving or copying data between the application servers 1100_1 to 1100_n and/or the storage servers 1200_1 to 1200_m. In this case, the data may be moved from the storage devices 1250_1 to 1250_m of the storage servers 1200_1 to 1200_m to the memories 1120_1 to 1120_n of the application servers 1100_1 to 1100_n directly or through the memories 1220_1 to 1220_m of the storage servers 1200_1 to 1200_m. The data moved through the network NT may be data encrypted for security or privacy.

In an embodiment, the storage servers 1200_1 to 1200_m or the storage devices 1150_1 to 1150_n and 1250_1 to 1250_m may include a mapping cache manager and a request scheduler according to an embodiment of the present disclosure. That is, at least one of the storage servers 1200_1 to 1200_m or the storage devices 1150_1 to 1150_n and 1250_1 to 1250_m may cache address mapping information based on the method described with reference to FIGS. 1 to 15. As such, it may be possible to provide a data access by a unit (e.g., a byte unit or a cache line unit) smaller than the block unit and to process a second-type request including a physical address. Also, performance and latency requirements may be satisfied by scheduling received requests.

Accordingly, a storage system according to an embodiment of the present disclosure may provide improved performance with respect to an application (e.g., an AI-based recommendation model or a deep learning recommendation model (DLRM)) that needs to access data of the storage servers 1200_1 to 1200_m or the storage devices 1150_1 to 1150_n and 1250_1 to 1250_m by a unit smaller than the block unit and irregularly (e.g., an application whose data access unit is small or random).

According to an embodiment of the present disclosure, a storage device may provide a block interface circuit and a memory interface circuit. Accordingly, a storage device with improved performance, an operation method of the storage device, and a storage system including the same are provided.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A storage device comprising:
   a nonvolatile memory device; and
   a storage controller, wherein the storage controller includes:
     a multi-protocol host interface circuit configured to:
       receive a first-type request including a first logical address from an external host,
       transmit/receive data corresponding to the first-type request to/from the external host by a block unit,
       receive a second-type request including a first physical address from the external host, and
       transmit/receive data corresponding to the second-type request to/from the external host by a unit smaller than the block unit; and
     a mapping cache manager configured to:
       manage an address translation table cache,
       send an address translation request including the first physical address to the external host, and
       receive a response including mapping information corresponding to the first physical address from the external host.

2. The storage device of claim 1, wherein the mapping cache manager:
   caches a portion of mapping information between a logical address and a physical address managed by the external host,
   stores, in response to the response, a second logical address in the address translation table cache that is correlated with the first physical address, and
   translates the first physical address into the second logical address based on the address translation table cache.

3. The storage device of claim 2, further comprising a flash translation layer configured to translate the first logical address into a first physical page address in response to the first-type request and to translate the second logical address received from the mapping cache manager into a second physical page address in response to the second-type request.

4. The storage device of claim 2, wherein the mapping cache manager receives an address invalidation request including the first physical address from the external host and invalidates mapping information of the first physical address in the address translation table cache in response to the address invalidation request.

5. The storage device of claim 1, further comprising a request scheduler configured to schedule the first-type request and the second-type request.

6. The storage device of claim 5, wherein under control of the request scheduler and when the second-type request is received after the first-type request is received, an input/output command corresponding to the second-type request is transferred to the nonvolatile memory device and then an input/output command corresponding to the first-type request is transferred to the nonvolatile memory device.

7. The storage device of claim 5, wherein under control of the request scheduler and after the first-type request is received, the second-type request is received and then a command corresponding to the first-type request is transferred to the nonvolatile memory device, a suspend command corresponding to the first-type request is transferred to the nonvolatile memory device, an input/output command corresponding to the second-type request is transferred to the nonvolatile memory device, and a resume command corresponding to the first-type request is transferred to the nonvolatile memory device.

8. The storage device of claim 5, wherein:
the request scheduler schedules the first-type request and the second-type request based on arbitration information received from the external host and current status information, and
the current status information includes status information of current input/output requests, QoS configuration information, and information about a ratio of a cache miss and a cache hit of the address translation table cache.

9. The storage device of claim 1, wherein the first-type request corresponds to an NVMe (Non-Volatile Memory express) protocol and the second-type request corresponds to a CXL (Compute eXpress Link) protocol.

10. An operation method of a storage device which includes a nonvolatile memory device and a storage controller, the method comprising:
receiving a first-type request including a first logical address and first data size information of a first unit, which is a block unit, from an external host;
performing an operation corresponding to the first-type request on the nonvolatile memory device;
receiving a second-type request including a first physical address and second data size information of a second unit smaller than the first unit from an external host;
sending an address translation request including the first physical address to the external host in response to the second-type request;
receiving a response including a second logical address corresponding to the first physical address from the external host; and
performing an operation corresponding to the second-type request on the nonvolatile memory device, based on the response including the second logical address.

11. The method of claim 10, wherein the performing of the operation corresponding to the first-type request on the nonvolatile memory device includes:
translating, by the storage controller, the first logical address into a first physical page address based on a mapping table; and
sending, by the storage controller, an input/output command including the first physical page address and corresponding to the first-type request to the nonvolatile memory device.

12. The method of claim 10, wherein the performing of the operation corresponding to the second-type request on the nonvolatile memory device based on the response including the second logical address includes:
storing, by the storage controller, the second logical address in an address translation table cache to be correlated with the first physical address;
translating, by the storage controller, the first physical address into the second logical address based on the address translation table cache;
translating, by the storage controller, the second logical address into a second physical page address based on the mapping table; and
sending, by the storage controller, an input/output command including the second physical page address and corresponding to the second-type request to the nonvolatile memory device.

13. The method of claim 10, the method further comprising:
receiving, by the storage controller, another second-type request including a second physical address and third data size information of the second unit from the external host;
determining, by the storage controller and in response to the other second-type request, whether mapping information about the second physical address is present in an address translation table cache;
when the mapping information about the second physical address is present, translating by the storage controller the second physical address into a third logical address based on the address translation table cache;
translating, by the storage controller, the third logical address into a third physical page address based on a mapping table; and
sending, by the storage controller, an input/output command including the third physical page address and corresponding to the other second-type request to the nonvolatile memory device.

14. The method of claim 10, further comprising:
receiving an address invalidation request including the first physical address from the external host;
invalidating mapping information of the first physical address in an address translation table cache in response to the address invalidation request; and
sending a response corresponding to the address invalidation request to the external host.

15. The method of claim 10, further comprising scheduling the first-type request and the second-type request.

16. The method of claim 10, further comprising:
receiving arbitration information from the external host;
setting an arbitration scheme and a parameter based on the arbitration information; and
scheduling the first-type request and the second-type request based on the arbitration scheme and the parameter.

17. The method of claim 16, further comprising:

determining whether a condition of needing to change the parameter is satisfied; and when the condition is satisfied, changing a value of the parameter based on current status information and the arbitration information, wherein the current status information includes status information of current input/output requests, QoS configuration information, and information about a ratio of a cache miss and a cache hit of an address translation table cache.

18. A storage system comprising:

a host configured to:

send a first-type request including a first logical address, send a second-type request including a first physical address, and manage mapping information between a logical address and a physical address; and a storage device configured to:

receive the first-type request and the second-type request from the host, cache a portion of the mapping information to manage an address mapping table cache, provide a data access of a block unit in response to the first-type request, and provide a data access of a unit smaller than the block unit in response to the second-type request.

19. The storage system of claim 18, wherein:

the storage device sends an address translation request for a first physical address to the host, and in response to the address translation request, the host translates the first physical address into a second logical address based on the mapping information and sends a response including the second logical address to the storage device.

20. The storage system of claim 18, wherein:

when mapping information about the first physical address is updated, the host sends an invalidation request for the first physical address to the storage device, and the storage device invalidates mapping information about the first physical address in response to the invalidation request.

* * * * *